United States Patent
Honda

(10) Patent No.: US 11,405,555 B2
(45) Date of Patent: Aug. 2, 2022

(54) INFORMATION PROCESSING APPARATUS, IMAGE CAPTURING APPARATUS, INFORMATION PROCESSING METHOD, AND STORAGE MEDIUM

(71) Applicant: CANON KABUSHIKI KAISHA, Tokyo (JP)

(72) Inventor: Yoshiaki Honda, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 199 days.

(21) Appl. No.: 16/728,350

(22) Filed: Dec. 27, 2019

(65) Prior Publication Data

US 2020/0213496 A1    Jul. 2, 2020

(30) Foreign Application Priority Data

Dec. 28, 2018   (JP) .............................. JP2018-248372

(51) Int. Cl.
  *H04N 5/232* (2006.01)
  *H04N 5/235* (2006.01)

(52) U.S. Cl.
  CPC ......... *H04N 5/2327* (2013.01); *H04N 5/2353* (2013.01); *H04N 5/23254* (2013.01)

(58) Field of Classification Search
  CPC ............. H04N 5/23212; H04N 5/2628; H04N 5/23293; H04N 5/2252
  See application file for complete search history.

(56) References Cited

U.S. PATENT DOCUMENTS

2009/0316009 A1* 12/2009 Ito .................. H04N 5/243
                                                                348/208.4

FOREIGN PATENT DOCUMENTS

JP        2008-172667 A      7/2008

\* cited by examiner

*Primary Examiner* — Timothy J Henn
*Assistant Examiner* — Fayez A Bhuiyan
(74) *Attorney, Agent, or Firm* — Cowan, Liebowitz & Latman, P.C.

(57) ABSTRACT

There is provided an information processing apparatus. A detecting unit detects a first motion amount of an object from an image obtained through first shooting carried out repeatedly at predetermined intervals of time. A converting unit converts the first motion amount into a first motion blur amount that will arise in second shooting, on the basis of the predetermined intervals of time and a shutter speed used in the second shooting. A determining unit determines a first shutter speed adjustment step size on the basis of a difference between the first motion blur amount and a first target motion blur amount that is lower than the first motion blur amount. A changing unit changes the shutter speed of the second shooting at the first shutter speed adjustment step size in response to a first shutter speed changing unit being operated.

13 Claims, 15 Drawing Sheets

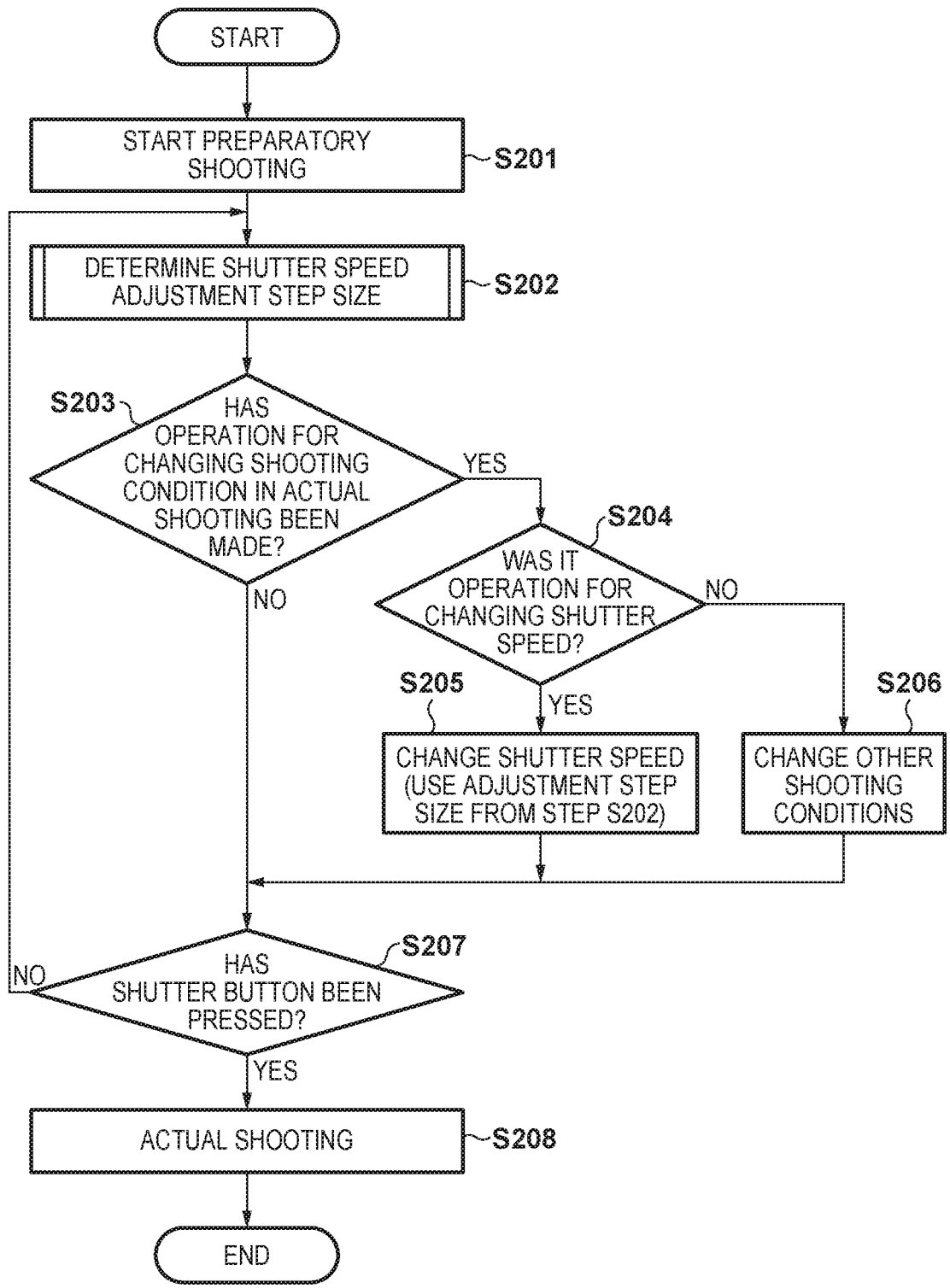

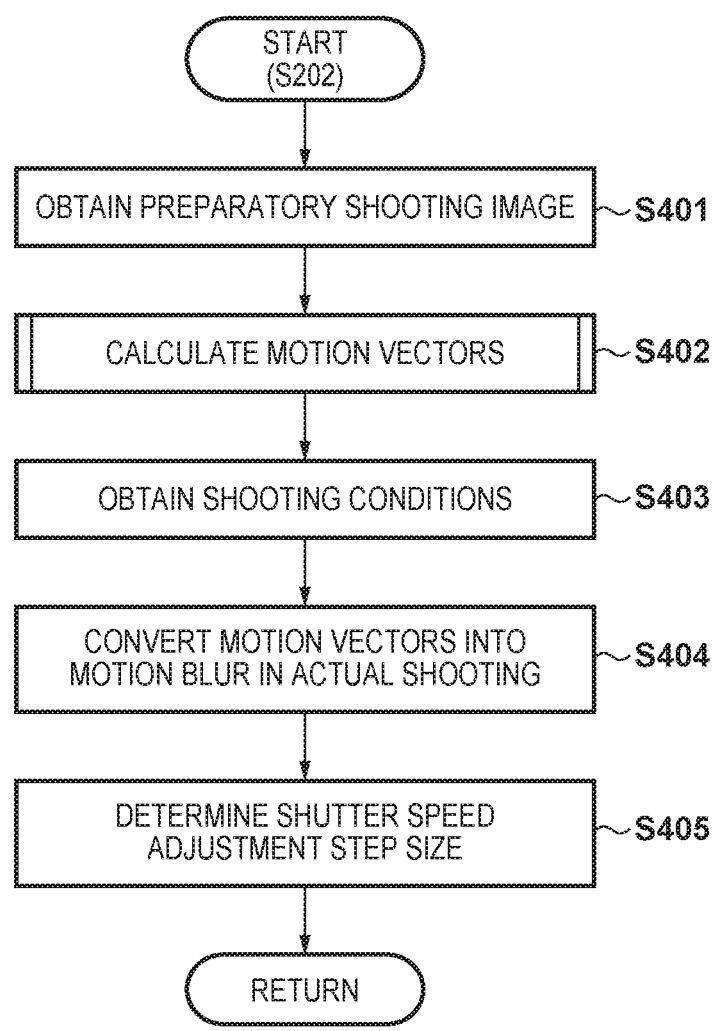

PREPARATORY SHOOTING IMAGE

MOTION VECTORS

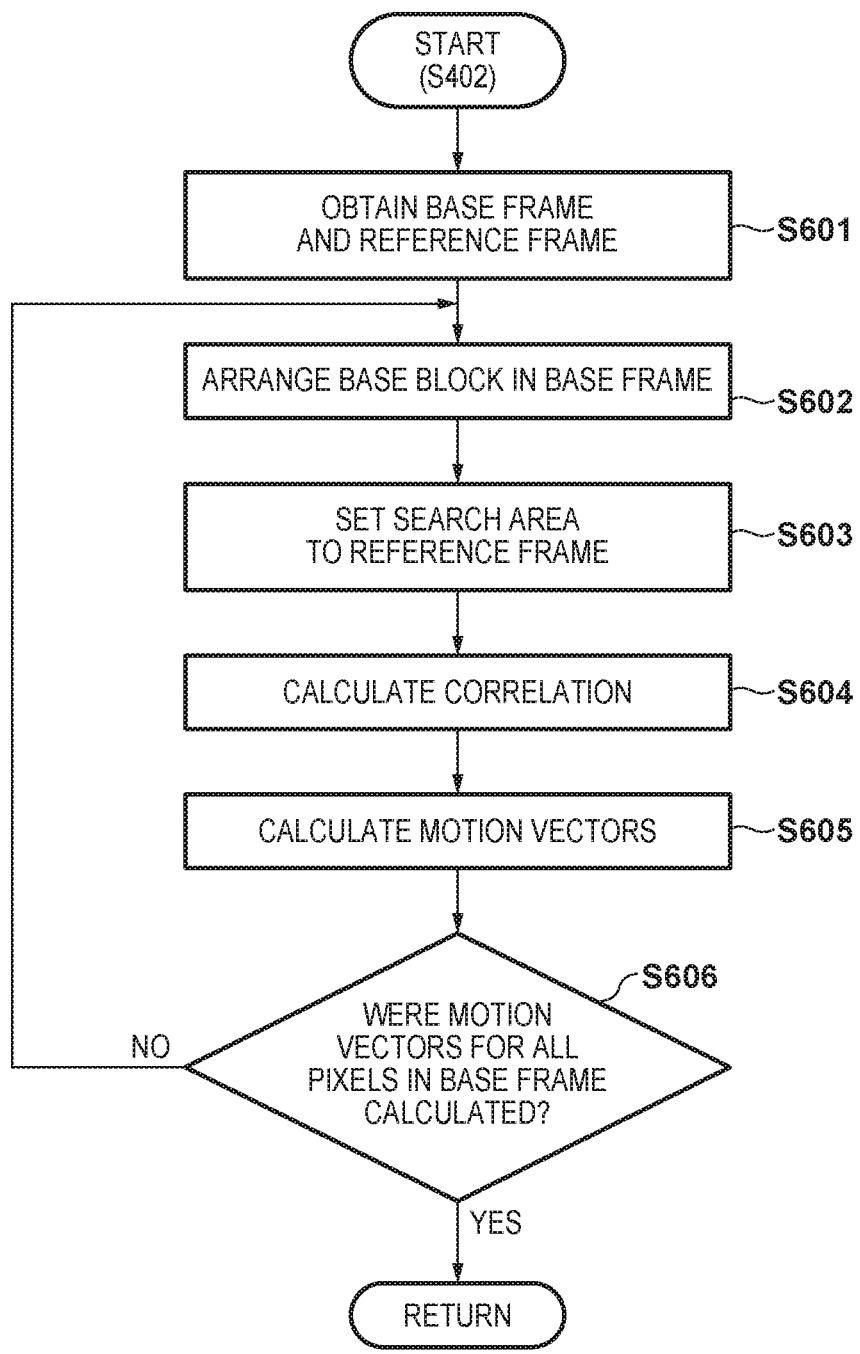

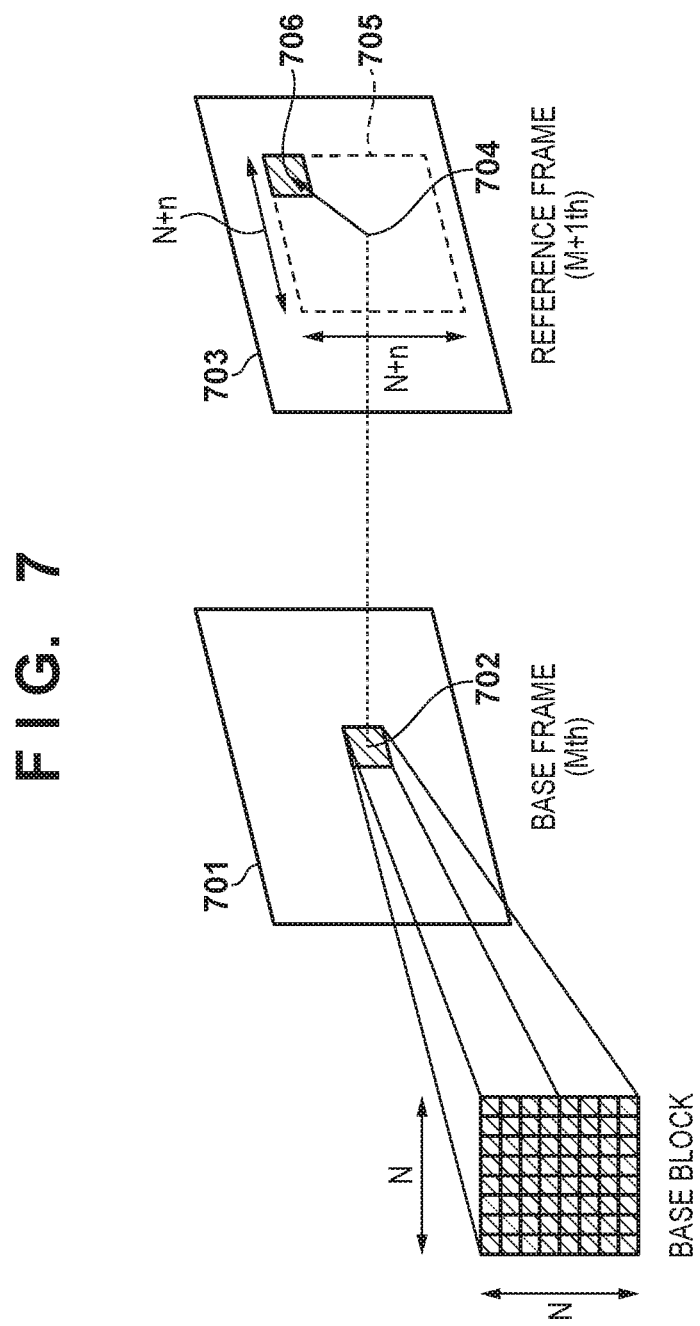

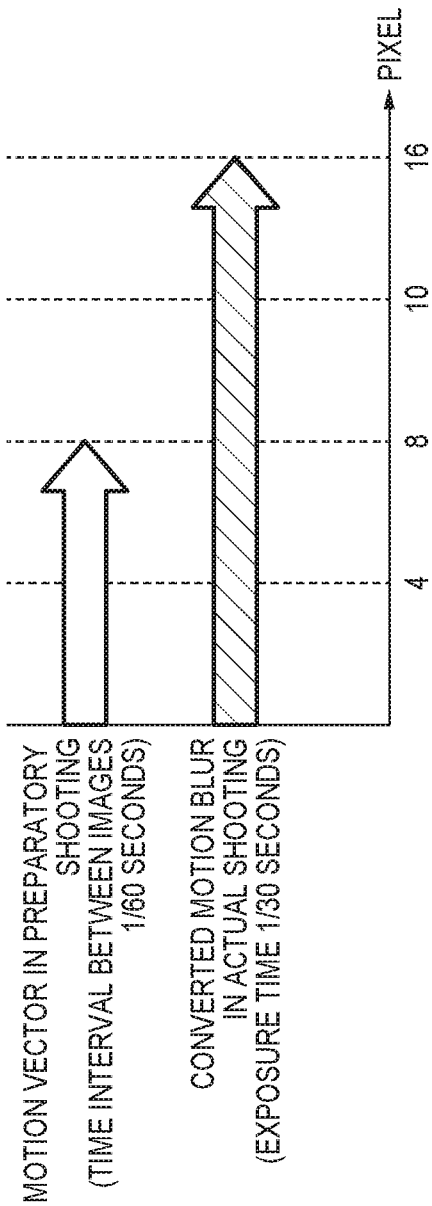
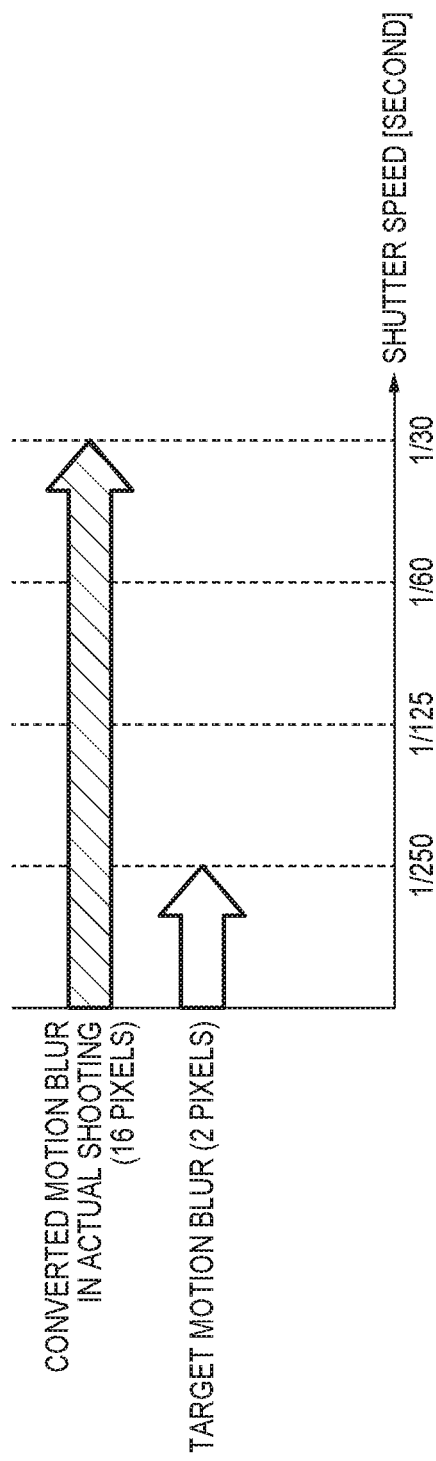

F I G. 10
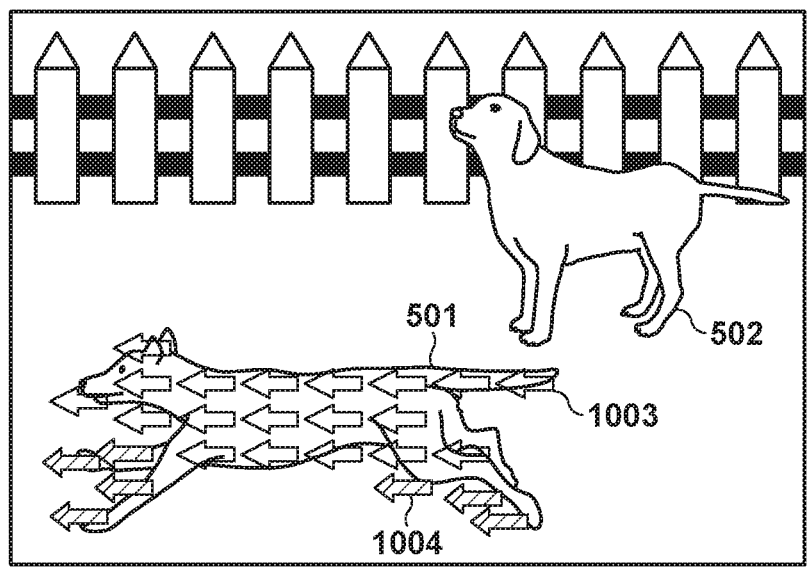
MOTION VECTORS

MOTION VECTORS

INFORMATION PROCESSING APPARATUS, IMAGE CAPTURING APPARATUS, INFORMATION PROCESSING METHOD, AND STORAGE MEDIUM

BACKGROUND OF THE INVENTION

Field of the Invention

The present invention relates to an information processing apparatus, an image capturing apparatus, an information processing method, and a storage medium.

Description of the Related Art

Recently, some commercial models of image capturing apparatuses such as digital still cameras are provided with a shooting mode called "shutter speed priority mode". The shutter speed priority mode is a shooting mode in which the photographer sets a desired shutter speed, and the image capturing apparatus then automatically sets exposure setting values aside from the shutter speed, such as the aperture value, ISO sensitivity, and so on. The photographer can shoot an image at his or her preferred shutter speed by using the shutter speed priority mode in this manner. For example, setting a fast shutter speed before shooting an image and then shooting the image in the shutter speed priority mode makes it possible to shoot an image having little motion blur.

Japanese Patent Laid-Open No. 2008-172667 discloses a technique that makes it possible for a photographer to visually confirm a motion region during preparatory shooting. "Preparatory shooting" refers to shooting carried out by the photographer to compose the shot, set the shooting conditions, and so on while looking at an electronic viewfinder or rear surface LCD of the image capturing apparatus. According to the technique disclosed in Japanese Patent Laid-Open No. 2008-172667, a motion region is detected between time-series images capturing during preparatory shooting, and that motion region is displayed in an emphasized manner.

In the shutter speed priority mode, the user typically changes the shutter speed by manipulating a dial, swiping a touch panel, or the like. Here, if there is a major difference between the set shutter speed and the user's desired shutter speed (e.g., a shutter speed fast enough to ensure the object is not blurry), the user must make more operations to change the shutter speed to the desired value. It thus takes longer to change the shutter speed, and the user may miss his or her chance to take the shot as a result.

SUMMARY OF THE INVENTION

Having been achieved in light of such circumstances, the present invention provides a technique which makes it possible to change the shutter speed at an adjustment step size that is based on motion blur of an object.

According to a first aspect of the present invention, there is provided an information processing apparatus comprising at least one processor and/or at least one circuit which functions as: a detecting unit configured to detect a first motion amount of an object from an image obtained through first shooting, the first shooting being carried out repeatedly at predetermined intervals of time; a converting unit configured to convert the first motion amount into a first motion blur amount that will arise in second shooting, on the basis of the predetermined intervals of time and a shutter speed used in the second shooting; a determining unit configured to determine a first shutter speed adjustment step size on the basis of a difference between the first motion blur amount and a first target motion blur amount that is lower than the first motion blur amount; and a changing unit configured to change the shutter speed of the second shooting at the first shutter speed adjustment step size in response to a first shutter speed changing unit being operated.

According to a second aspect of the present invention, there is provided an information processing apparatus comprising at least one processor and/or at least one circuit which functions as: a detecting unit configured to detect a first motion amount of a first object, and a second motion amount, which is greater than the first motion amount, of a second object, from an image obtained through first shooting, the first shooting being carried out repeatedly at predetermined intervals of time; a converting unit configured to convert the first motion amount into a first motion blur amount that will arise in second shooting, and convert the second motion amount into a second motion blur amount that will arise in the second shooting, on the basis of the predetermined intervals of time and a shutter speed used in the second shooting; a determining unit configured to determine a first shutter speed adjustment step size on the basis of a difference between the first motion blur amount and a target motion blur amount that is lower than the first motion blur amount, and to determine a second shutter speed adjustment step size on the basis of a difference between the second motion amount and the target motion blur amount, as well as on the basis of the first shutter speed adjustment step size; and a changing unit configured to change the shutter speed for the second shooting at the first shutter speed adjustment step size in response to a first shutter speed changing unit being operated, and to further change the shutter speed for the second shooting, which had been changed at the first shutter speed adjustment step size, at the second shutter speed adjustment step size in response to the first shutter speed changing unit being operated again.

According to a third aspect of the present invention, there is provided an information processing apparatus comprising at least one processor and/or at least one circuit which functions as: an obtaining unit configured to obtain a first shot image obtained through first shooting at a first shutter speed, and motion information of an object in the first shot image; a setting unit configured to set a second shutter speed independently from the first shutter speed; an estimating unit configured to estimate a first motion blur amount of the object in a second shot image obtained when carrying out second shooting at the second shutter speed, on the basis of the motion information and the second shutter speed; a determining unit configured to determine a first shutter speed adjustment step size on the basis of a difference between the first motion blur amount and a first target motion blur amount that is lower than the first motion blur amount; and a changing unit configured to change the second shutter speed at the first shutter speed adjustment step size in response to a first shutter speed changing unit being operated.

According to a fourth aspect of the present invention, there is provided an information processing apparatus comprising at least one processor and/or at least one circuit which functions as: an obtaining unit configured to obtain a first shot image obtained through first shooting at a first shutter speed, first motion information of a first object in the first shot image, and second motion information of a second object moving faster than the first object in the first shot image; a setting unit configured to set a second shutter speed independently from the first shutter speed; an estimating unit configured to estimate a first motion blur amount of the first object in a second shot image obtained when carrying out second shooting at the second shutter speed, on the basis of the first motion information and the second shutter speed, and to estimate a second motion blur amount of the second object in the second shot image, on the basis of the second motion information and the second shutter speed; a determining unit configured to determine a first shutter speed adjustment step size on the basis of a difference between the first motion blur amount and a target motion blur amount that is lower than the first motion blur amount, and to determine a second shutter speed adjustment step size on the basis of a difference between the second motion amount and the target motion blur amount, as well as on the basis of the first shutter speed adjustment step size; and a changing unit configured to change the second shutter speed at the first shutter speed adjustment step size in response to a first shutter speed changing unit being operated, and to further change the second shutter speed, which had been changed at the first shutter speed adjustment step size, at the second shutter speed adjustment step size in response to the first shutter speed changing unit being operated again.

According to a fifth aspect of the present invention, there is provided an image capturing apparatus comprising: the information processing apparatus according to the first aspect; and an image sensor.

According to a sixth aspect of the present invention, there is provided an image capturing apparatus comprising: the information processing apparatus according to the third aspect; and an image sensor.

According to a seventh aspect of the present invention, there is provided an information processing method executed by an information processing apparatus, comprising: detecting a first motion amount of an object from an image obtained through first shooting, the first shooting being carried out repeatedly at predetermined intervals of time; converting the first motion amount into a first motion blur amount that will arise in second shooting, on the basis of the predetermined intervals of time and a shutter speed used in the second shooting; determining a first shutter speed adjustment step size on the basis of a difference between the first motion blur amount and a first target motion blur amount that is lower than the first motion blur amount; and changing the shutter speed of the second shooting at the first shutter speed adjustment step size in response to a first shutter speed changing unit being operated.

According to an eighth aspect of the present invention, there is provided an information processing method executed by an information processing apparatus, comprising: obtaining a first shot image obtained through first shooting at a first shutter speed, and motion information of an object in the first shot image; setting a second shutter speed independently from the first shutter speed; estimating a first motion blur amount of the object in a second shot image obtained when carrying out second shooting at the second shutter speed, on the basis of the motion information and the second shutter speed; determining a first shutter speed adjustment step size on the basis of a difference between the first motion blur amount and a first target motion blur amount that is lower than the first motion blur amount; and changing the second shutter speed at the first shutter speed adjustment step size in response to a first shutter speed changing unit being operated.

According to a ninth aspect of the present invention, there is provided a non-transitory computer-readable storage medium which stores a program for causing a computer to execute an information processing method comprising: detecting a first motion amount of an object from an age obtained through first shooting, the first shooting being carried out repeatedly at predetermined intervals of time; converting the first motion amount into a first motion blur amount that will arise in second shooting, on the basis of the predetermined intervals of time and a shutter speed used in the second shooting; determining a first shutter speed adjustment step size on the basis of a difference between the first motion blur amount and a first target motion blur amount that is lower than the first motion blur amount; and changing the shutter speed of the second shooting at the first shutter speed adjustment step size in response to a first shutter speed changing unit being operated.

According to a tenth aspect of the present invention, there is provided a non-transitory computer-readable storage medium which stores a program for causing a computer to execute an information processing method comprising: obtaining a first shot image obtained through first shooting at a first shutter speed, and motion information of an object in the first shot image; setting a second shutter speed independently from the first shutter speed; estimating a first motion blur amount of the object in a second shot image obtained when carrying out second shooting at the second shutter speed, on the basis of the motion information and the second shutter speed; determining a first shutter speed adjustment step size on the basis of a difference between the first motion blur amount and a first target motion blur amount that is lower than the first motion blur amount; and changing the second shutter speed at the first shutter speed adjustment step size in response to a first shutter speed changing unit being operated.

Further features of the present invention will become apparent from the following description of exemplary embodiments with reference to the attached drawings.

BRIEF DESCRIPTION OF THE DRAWINGS

FIG. 2 is a flowchart illustrating a shooting process.

FIG. 4 is a flowchart illustrating a process for determining a shutter speed adjustment step size (step S202 in FIG. 2).

FIG. 6 is a flowchart illustrating a motion vector calculation process (step S402 in FIG. 4).

FIG. 7 is a diagram illustrating the motion vector calculation process (step S402 in FIG. 4).

FIG. 8 is a diagram illustrating a motion vector in preparatory shooting, and motion blur, in actual shooting, converted from the motion vector in the preparatory shooting (converted motion blur), according to the first embodiment.

FIG. 9 is a diagram illustrating a relationship between a current shutter speed corresponding to the converted motion blur and a shutter speed corresponding to a target motion blur, according to the first embodiment.

FIG. 10 is a diagram illustrating an example of motion vectors in a preparatory shooting image according to a second embodiment.

DESCRIPTION OF THE EMBODIMENTS

Figure 1A:
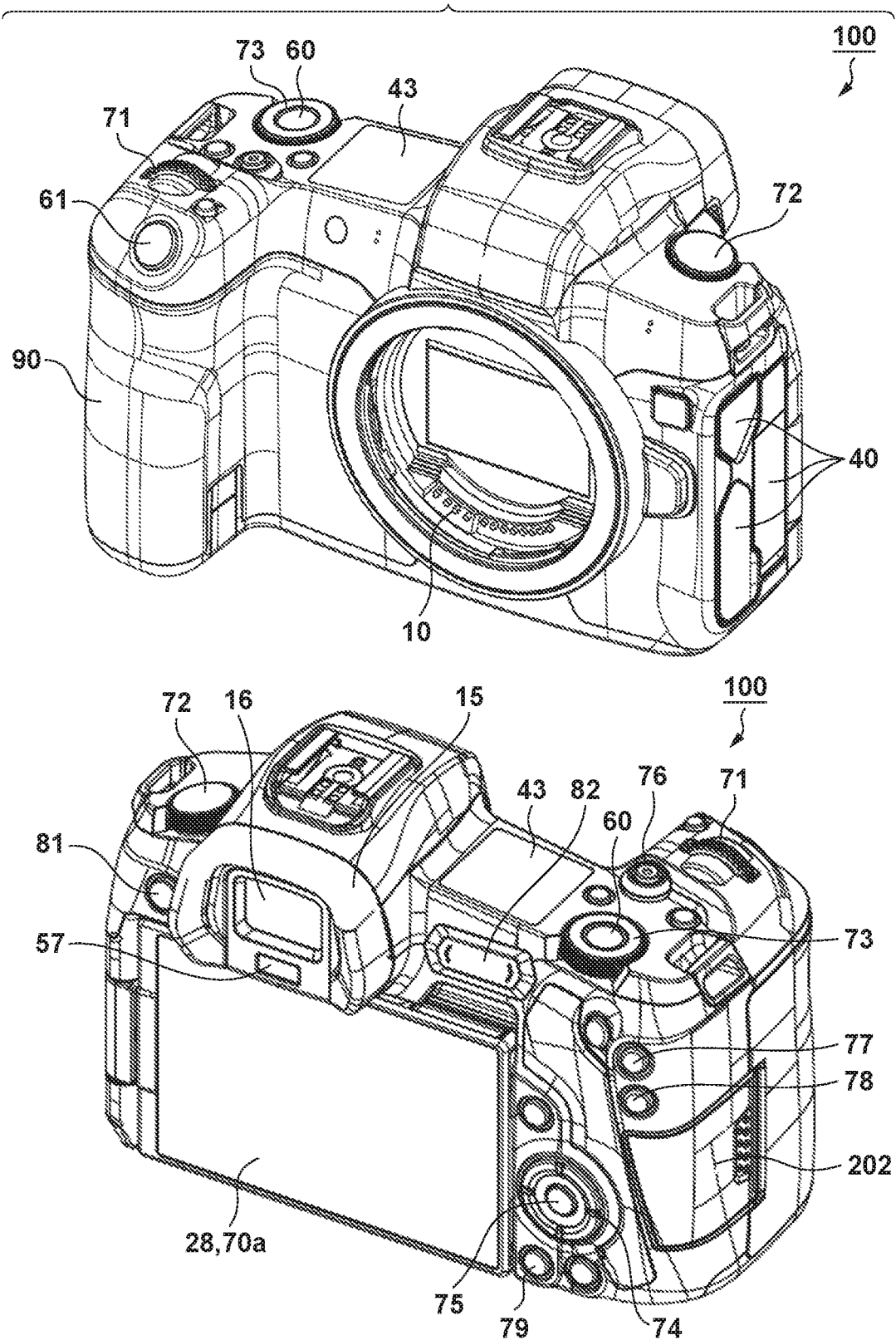
FIG. 1A is an external view of an image capturing apparatus 100 including an information processing apparatus.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

A first embodiment will describe a configuration in which a shutter speed adjustment step size is determined on the basis of a difference between a motion blur amount which will arise in actual shooting and a target motion blur amount.

FIG. 1A is an external view of an image capturing apparatus 100 including an information processing apparatus in which the present invention can be applied. The upper part of FIG. 1A is a perspective view illustrating the front side of the image capturing apparatus 100, and the lower part of FIG. 1A is a perspective view illustrating the rear side of the image capturing apparatus 100.

In FIG. 1A, a display unit 28 is a display unit, provided in a rear surface of the camera, that displays images, various types of information, and the like. A touch panel 70a can detect touch operations made on the display surface (operation surface) of the display unit 28. An outside-viewfinder display unit 43 is a display unit provided in a top surface of the camera, and displays various setting values of the camera, including shutter speed and aperture. A shutter button 61 is an operation unit for making a shooting instruction. A mode changing switch 60 is an operation unit for switching among various types of modes. A terminal cover 40 is a cover for protecting a connector (not shown) for connecting a connection cable or the like that connects the image capturing apparatus 100 to an external device.

A main electronic dial 71 is a rotating operation member included in an operation unit 70 (FIG. 1B), and setting values such as the shutter speed and aperture can be changed or the like by rotating the main electronic dial 71. A power switch 72 is an operation member that switches the power of the image capturing apparatus 100 on and off. A sub electronic dial 73 is a rotating operation member included in the operation unit 70, and a selection frame can be moved, images can be cycled through, and so on by rotating the sub electronic dial 73. A directional key 74 is a directional key, included in the operation unit 70, having top, bottom, left, and right parts that can be pressed (a four-direction key). An operation can be made based on the part, of the directional key 74 that has been pressed.

A set button 75 is a pushbutton included in the operation unit 70 which is used mainly to confirm selected items. A moving image button 76 is used to instruct moving image shooting (recording) to start and stop. An AE lock button 77 is included in the operation unit 70, and the exposure state can be fixed by pressing the AE lock button 77 while in a shooting standby state. An enlarge button 78 is an operation button, included in the operation unit 70, for turning an enlarged mode on and off during a live view display in the shooting mode. The LV image can be enlarged or reduced by operating the main electronic dial 71 after turning the enlarged mode on. In a playback mode, the enlarge button 78 functions as an enlarging button for enlarging the displayed image and increasing the magnification. A playback button 79 is an operation button, included in the operation unit 70, that switches between the shooting mode and the playback mode. Pressing the playback button 79 during the shooting mode causes a transition to the playback mode, and the newest image among images recorded in a recording medium 200 (FIG. 1B) can be displayed in the display unit 28. A menu button 81 is included in the operation unit 70, and a menu screen in which various types of settings can be made is displayed in the display unit 28 when the button menu button 81 is pressed. A user can make various types of settings intuitively using the menu screen displayed in the display unit 28, along with the directional key 74, the set button 75, and so on.

A touch bar 82 is a linear touch-type operation member (line touch sensor) capable of accepting touch operations. The touch bar 82 is arranged in a position that can be operated by the thumb of the user's right hand while he or she is holding a grip portion 90, and is capable of accepting tap operations (operations where the user touches the touch bar 82 and removes his or her finger without sliding it within a predetermined amount of time). The touch bar 82 is also capable of accepting left and right slide operations (operations where the user touches the touch bar 82 and then moves the touched position while touching the bar). The touch bar 82 is a different operation member from the touch panel 70a, and does not have a display function.

A communication terminal 10 is a communication terminal through which the image capturing apparatus 100 communicates with (removable) lens. An eyepiece portion 16 is an eyepiece portion for an ocular viewfinder (a look-through type of viewfinder), and the user can view video displayed in an internal EVF 29 (FIG. 1B) through the eyepiece portion 16. An eye proximity detecting unit 57 is an eye proximity detecting sensor that detects whether or not the photographer's eye is close to the eyepiece portion 16. A cover 202 is a cover for a slot into which the recording medium 200 is inserted.

The grip portion 90 is a holding portion having a shape that the user can easily grip with his or her right hand while holding the image capturing apparatus 100. The shutter button 61 and the main electronic dial 71 are arranged in positions where they can be manipulated by the index finger of the user's right hand in a state where the user is holding the digital camera by gripping the grip portion 90 with the pinky, ring, and middle fingers of his or her right hand. The sub electronic dial 73 and the touch bar 82 are arranged in positions where they can be manipulated by the thumb of the user's right hand in the same state.

Figure 1B:
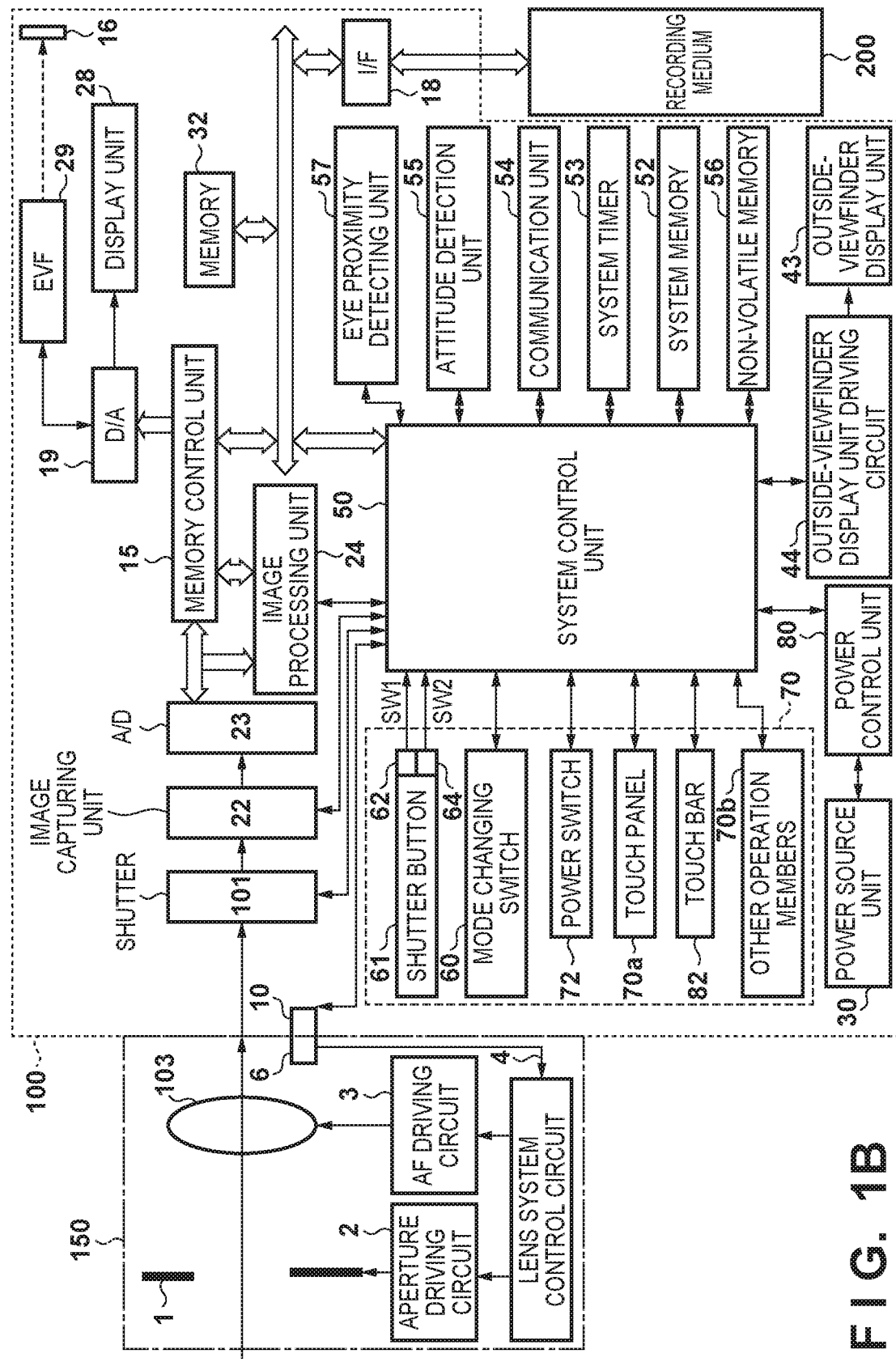
FIG. 1B is a block diagram illustrating an example of the configuration of the image capturing apparatus 100.

FIG. 1B is a block diagram illustrating an example of the configuration of the image capturing apparatus 100. In FIG. 1B, a lens unit 150 is an interchangeable lens unit including a shooting lens. A lens 103 is normally constituted by a plurality of lenses, but only one lens is shown here for the sake of simplicity. A communication terminal 6 is a communication terminal through which the lens unit 150 communicates with the image capturing apparatus 100, and the communication terminal 10 is a communication terminal through which the image capturing apparatus 100 communicates with the lens unit 150. The lens unit 150 communicates with a system control unit 50 through the communication terminals 6 and 10, and uses an internal lens system control circuit 4 to control an aperture stop 1 through an aperture driving circuit 2. The lens unit 150 also adjusts the focus by changing the position of the lens 103 through an AF driving circuit 3.

A shutter 101 is a focal plane shutter through which the exposure time of an image capturing unit 22 can be freely controlled under the control of the system control unit 50. The image capturing unit 22 is an image sensor constituted by a CCD, a CMOS element, or the like that converts an optical image into an electrical signal. The image capturing unit 22 may include an image capturing plane phase difference sensor that outputs defocus amount information to the system control unit 50. An A/D converter 23 converts analog signals into digital signals. The A/D converter 23 is used to convert analog signals output from the image capturing unit 22 into digital signals.

An image processing unit 24 carries out prescribed pixel interpolation, resizing processing such as reduction, color conversion processing, and the like on data from the A/D converter 23 or data from a memory control unit 15. The image processing unit 24 also performs predetermined computational processing using captured image data. The system control unit 50 performs exposure control and rangefinding control based on the computational results obtained by the image processing unit 24. A TTL (through-the-lens) AF (autofocus) process, art AE (automatic exposure) process, and an EF (flash pre-emission) process are realized as a result. The image processing unit 24 also performs predetermined computational processing using the captured image data, performing a TTL AWB (auto white balance) process on the basis of the obtained computational results.

Data output from the A/D converter 23 is written into memory 32 through the image processing unit 24 and the memory control unit 15, or directly through the memory control unit 15. The memory 32 stores the image data obtained by the image capturing unit 22 and converted into digital data by the A/D converter 23, image data for display in the display unit 28 and the EVF 29, and the like. The memory 32 is provided with a storage capacity sufficient to store a predetermined number of still images, a predetermined time's worth of moving images and audio, and so on.

The memory 32 also functions as image display memory video memory). A D/A converter 19 converts data for image display, stored in the memory 32, into an analog signal and supplies the analog signal to the display unit 28 and the EVF 29. Image data for display written into the memory 32 is thus displayed by the display unit 28 and the EVF 29 via the D/A converter 19 in this manner. The display unit 28 and the EVE 29 carry out displays in display devices, which are LCDs, organic EL displays, or the like, based on the analog signal from the D/A converter 19. The digital signals A/D-converted by the A/D converter 23 and stored in the memory 32 are converted into analog signals by the D/A converter 19, and those signals are then sequentially transferred and displayed in the display unit 28 or the EVE 29 to enable a live view display (LV display) The image displayed in the live view will be called a "live view image" (LV image) hereinafter.

Various setting values of the camera, including shutter speed and aperture, are displayed in the outside-viewfinder display unit 43 through an outside-viewfinder display unit driving circuit 44.

Non-volatile memory 56 is electrically erasable/recordable memory, and, for example, EEPROM is used. Operational constants, programs, and so on of the system control unit 50 are stored in the non-volatile memory 56. Here, "programs" refers to programs for executing the various flowcharts according to the present embodiment, which will be described later.

The system control unit 50 is a control unit constituted by at least one processor or circuit, and controls the entire image capturing apparatus 100. The system control unit 50 implements the respective processes according to the present embodiment, described later, by executing programs recorded in the non-volatile memory 56 mentioned above. Operational constants and variables of the system control unit 50, programs read out from the non-volatile memory 56, and so on are loaded into system memory 52, which uses RAM, for example. The system control unit 50 also carries out display control by controlling the memory 32, the D/A converter 19, the display unit 28, and so on. A system timer 53 is a time measurement unit that measures times used in various types of control, measures the time of an internal and clock, and so on.

The operation unit 70 is an operation unit for inputting various types of operating instructions to the system control unit 50. The mode changing switch 60 is an operation member, included in the operation unit 70, which switches the operating mode of the system control unit 50 among a still image shooting mode, a moving image shooting mode, a playback mode, and so on. The still image shooting mode includes an auto shooting mode, an auto scene determination mode, a manual mode, an aperture priority mode (Av mode), a shutter speed priority mode (Tv mode), a program AE mode (P mode), and so on. There are also various types of scene modes, custom modes, and the like as shooting settings for different shooting scenes. Using the mode changing switch 60, the user can switch directly to any one of these modes. Alternatively, the user may use the mode changing switch 60 to switch to a shooting mode list screen, select one of the plurality of modes displayed therein, and then use another operation member to switch to that mode. The moving image shooting mode may similarly include a plurality of modes.

A first shutter switch 62 switches on partway through the manipulation of the shutter button 61 provided in the image capturing apparatus 100, or in other words, when the button is depressed halfway (a shooting preparation instruction), and produces a first shutter switch signal SW1. Shooting preparation operations such as AF (autofocus) processes, AE (automatic exposure) processes, AWB (auto white balance)

processes, and EF (flash pre-emission) processes are started by the first shutter switch signal SW1.

A second shutter switch 64 turns on when the shutter button 61 is completely operated, or in other words, is fully depressed (a shooting instruction), and produces a second shutter switch signal SW2, The system control unit 50 commences a series of shooting processes, from reading out signals from the image capturing unit 22 to writing the captured image into the recording medium 200 as an image file, in response to the second shutter switch signal SW2.

The operation unit 70 includes various types of operation members as input units for accepting operations from the user. The operation unit 70 includes at least the following operation units. These units include the shutter button 61, the main electronic dial 71, the power switch 72, the sub electronic dial 73, the directional key 74, the set button 75, the moving image button 76, the AE lock button 77, the enlarge button 78, the playback button 79, the menu button 81, and the touch bar 82. "Other operation members 70b" collectively represents operation members not indicated individually in the block diagram.

A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200. A power source unit 30 is constituted by a primary battery such as an alkali battery, a lithium battery, or the like, a secondary battery such as a NiCd battery, a NiMH battery, a Li battery, or the like, an AC adapter, and so on.

A recording medium I/F 18 is an interface for the recording medium 200, which is a memory card, a hard disk, or the like. The recording medium 200 is a recording medium for recording shot images, such as a memory card or the like, and is constituted by semiconductor memory, a magnetic disk, or the like.

A communication unit 54 is connected wirelessly or over a hardwire cable, and sends and receives video signals, audio signals, and the like. The communication unit 54 can also connect to a wireless LAN (local area network), the Internet, and so on. The communication unit 54 is also capable of communicating with the external device over Bluetooth (registered trademark), Bluetooth Low Energy, or the like. The communication unit 54 can transmit images captured by the image capturing unit 22 (including LV images), images recorded in the recording medium 200, and the like, and can also receive images and various other types of information from the external device.

An attitude detection unit 55 detects the attitude of the image capturing apparatus 100 relative to the gravitational direction. Whether an image captured by the image capturing unit is an image shot while the image capturing apparatus 100 was held horizontally or vertically can be determined on the basis of the attitude detected by the attitude detection unit 55. The system control unit 50 can add orientation information based on the attitude detected by the attitude detection unit 55 to the image file of an image captured by the image capturing unit 22, record the image in a rotated state, and so on. An accelerometer, a gyrosensor, or the like can be used as the attitude detection unit 55. It is also possible to detect movement of the image capturing apparatus 100 (pan, tilt, lifting, whether or not the apparatus is at rest, and the like) using the accelerometer, gyrosensor, or the like serving as the attitude detection unit 55.

The eye proximity detecting unit 57 is an eye proximity detecting sensor that detects whether an eye (an object) has approached (eye proximity) or has moved away from (eye non-proximity) the eyepiece portion 16 of the viewfinder (proximity detection). The system control unit 50 switches the display unit 28 and the EVF 29 between displaying (a display state)/not displaying (a non-display state) in accordance with the state detected by the eye proximity detecting unit 57. More specifically, when the apparatus is at least in the shooting standby state and the display destination is set to be switched automatically, the display destination is turned on for the display unit 28 and off for the EVF 29 when the user's eye is not in proximity. Conversely, the display destination is turned on for the EVF 29 and off for the display unit 28 when the user's eye is in proximity. For example, the eye proximity detecting unit 57 can use an infrared proximity sensor, and can therefore detect when an object is in the proximity of the eyepiece portion 16 of the viewfinder that includes the EVF 29. When an object is in the proximity, infrared rays emitted from a light-emitting unit (not shown) of the eye proximity detecting unit 57 are reflected and received by a light-receiving unit (not shown) of the infrared proximity sensor. The distance of the object from the eyepiece portion 16 (eye proximity distance) can be determined on the basis of the amount of infrared light that has been received. In this manner, the eye proximity detecting unit 57 carries out eye detection, in which the distance of an object in the proximity of the eyepiece portion 16 is detected. When, in an eye non-proximate state (a non-proximate state), an object has been detected within a prescribed distance from the eyepiece portion 16, it is determined that eye proximity has been detected. When, in the eye-proximate state (a proximate state), the object that had been detected as being in the proximity moves away by greater than or equal to a prescribed distance, it is determined that eye non-proximity has been detected. A threshold for detecting eye proximity and a threshold for detecting eye non-proximity may differ by, for example, applying hysteresis. Additionally, after eye proximity has been detected, the eye-proximate state is considered to be in effect until eye non-proximity has been detected. Additionally, after eye non-proximity has been detected, the eye non-proximate state is considered to be in effect until eye proximity is detected. Note that the infrared proximity sensor is an example, and another sensor may be employed as the eye proximity detecting unit 57 as long as that sensor is capable of detecting that an eye or an object is nearby to indicate eye proximity.

The touch panel 70a and the display unit 28 can be configured as an integrated unit. For example, the touch panel 70a is configured having a light transmissibility that does not interfere with the display from the display unit 28, and is attached to the upper layer of a display surface of the display unit 28. An input coordinate system of the touch panel 70a is then associated with a display coordinate system on the display screen of the display unit 28. This makes it possible to provide a graphical user interface (GUI) that makes the user feel as if he or she can directly manipulate the screen displayed in the display unit 28. The system control unit 50 can detect the following operations or states with respect to the touch panel 70a.

When a finger or stylus that had not been touching the touch panel 70a newly touches the touch panel 70a. In other words, this is the start of a touch (called "touch-down" hereinafter).

When a finger or stylus is touching the touch panel 70a (called "touch-on" hereinafter).

When a finger or stylus is moved while touching the touch panel 70a (called "touch-move" hereinafter).

When a finger or stylus that had been touching the touch panel 70a is removed. In other words, this is the end of a touch (called "touch-up" hereinafter).

When nothing is touching the touch panel 70a (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or pens that had been touching.

These operations/states, positional coordinates on the touch panel 70a where the finger or stylus had been touching, and so on are communicated to the system control unit 50 through an internal bus. The system control unit 50 then determines what type of operation (touch operation) has been made on the touch panel 70a on the basis of the communicated information. With respect to a touch-move, the movement direction of the finger or stylus moving on the touch panel 70a can be determined on the basis of changes in the positional coordinates, for each of a vertical component and a horizontal component on the touch panel 70a, A slide operation is determined to have been carried out if a touch-move of greater than or equal to a prescribed distance has been detected. If, while touching the touch panel, the finger or stylus is quickly moved a given distance and then removed, the operation is called "flicking". In other words, a "flick" is an operation of quickly flicking a finger on the touch panel 70a. A flick can be determined to have been carried out if a touch-move of greater than or equal to a prescribed distance and at greater than or equal to a prescribed speed is detected and a touch-up is then detected (it can be determined that a flick occurred continuing from a slide operation). Furthermore, when a plurality of locations (two points, for example) are touched at the same time (multi-touch), and the touched positions are brought together, the touch operation is called a "pinch-in", whereas when the touched positions are moved apart, the touch operation is called a "pinch-out". Pinch-out and pinch-in are collectively referred to as pinch operations (or simply "pinching").

Any of a variety of types of touch panels, such as resistive film, electrostatic capacitance, surface elastic wave, infrared, electromagnetic induction, image recognition, and photodetector, may be used as the touch panel 70a. Depending on the type, a touch is detected when contact is made with the touch panel, or a touch is detected when a finger or stylus has approached the touch panel, and either of these types may be used.

The system control unit 50 can detect the following operations or states with respect to the touch bar 82.

When a finger that had not been touching the touch bar 82 newly touches the touch bar 81 in other words, this is the start of a touch (called "touch-down" hereinafter).

When a finger is touching the touch bar (called "touch-on" hereinafter).

When a finger is moved while touching the touch bar 82 (called "touch-move" hereinafter).

When a finger that had been touching the touch bar 82 is removed. In other words, this is the end of a touch (called "touch-up" hereinafter).

When nothing is touching the touch bar 82 (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or pens that had been touching.

These operations/states, as well as the positional coordinates on the touch bar 82 where the finger is touching, are communicated to the system control unit 50 via an internal bus, and the system control unit 50 determines what type of operation (touch operation) has been made on the touch bar 82 on the basis of the communicated information. For a touch-move, movement on the touch bar 82 in the horizontal direction (the left-right direction) is detected. A slide operation is determined to have been carried out if movement of greater than or equal to a prescribed distance has been detected. If the touch panel is touched with a finger and removed within a predetermined amount of time without making a slide operation, it is determined that a tap operation has been made.

In the present embodiment, the touch bar 82 is assumed to be an electrostatic capacitance-type touch sensor. However, the touch sensor may be another type, such as a resistive film, surface elastic wave, infrared, electromagnetic induction, image recognition, or photodetector type.

A shooting process executed by the image capturing apparatus 100 will be described next with reference to FIG. 2. Unless otherwise specified, the processes in the respective steps of this flowchart are realized by the system control unit 50 executing the aforementioned programs. The processing illustrated in this flowchart starts when the user turns the image capturing apparatus 100 on and an operating mode of the image capturing apparatus 100 enters a shooting mode.

In step S201, the system control unit 50 starts preparatory shooting (first shooting). During the period of the preparatory shooting, the image capturing apparatus 100 captures images in sequence, so as to appear as a moving image (a preparatory shooting image), and displays that image in the display unit 28. In other words, during the period of the preparatory shooting, the preparatory shooting is carried out repeatedly at predetermined intervals of time. The user composes the shot and so on while viewing the displayed preparatory shooting image. Note that the processes of steps S202 to S207 (described hereinafter) are carried out during the period of preparatory shooting.

In step S202, under the control of the system control unit 50, the image processing unit 2.4 determines a shutter speed adjustment step size on the basis of the preparatory shooting image. The process of step S202 will be described in detail later with reference to FIG. 4.

In step S203, the system control unit 50 determines whether or not a user operation for changing the shooting conditions in actual shooting (second shooting) has been made through the operation unit 70. The shooting conditions include exposure conditions, and the exposure conditions include the shutter speed, ISO sensitivity, F-stop value, and so on. If a user operation for changing the shooting conditions of the actual shooting has been made, the process moves to step S204, and if not, the process moves to step S207.

In step S204, the system control unit 50 determines whether or not the user operation subject to the determination of step S203 was a user operation for changing the shutter speed. If a user operation for changing the shutter speed has been made, the process moves to step S205, and if not, the process moves to step S206.

With respect to the operation member for the user operation for changing the shutter speed, it is assumed that a function for changing the shutter speed is assigned to one of the operation members included in the operation unit 70 through settings made in advance through the menu screen of the image capturing apparatus 100. For example, the function for changing the shutter speed can be assigned to the main electronic dial 71. In this case, it is determined that a user operation for changing the shutter speed has been made when the main electronic dial 71 has been rotated. As another example, the function for changing the shutter speed can be assigned to a swipe operation made on the touch panel 70a.

In step S205, the system control unit 50 changes the shutter speed in accordance with the shutter speed adjustment step size determined in step S202. Thus according to the present embodiment, the system control unit 50 changes the shutter speed for the actual shooting in accordance with the shutter speed adjustment step size determined in step S202, in response to a shutter speed change member such as the main electronic dial 71 being operated.

On the other hand, a determination of "no" in step S204 means that a user operation has been made for changing shooting conditions for the actual shooting aside from the shutter speed. In this case, in step S206, the system control unit 50 changes the shooting conditions in accordance with the details of the user operation that has been made.

In step S207, the system control unit 50 determines whether or not the user has pressed the shutter button 61. If the shutter button 61 has been pressed, the process moves to step S208, and if not, the process returns to step S202.

While viewing the preparatory shooting image displayed in the display unit 28, the user can press the shutter button 61 when he or she has the chance to take a shot. If the user has determined that he or she does not yet have the chance to take a shot, he or she can avoid pressing the shutter button 61, which returns the process to step S202 and makes it possible to change (reset) the shooting conditions for the actual shooting. In this manner, during the preparatory shooting, the user can repeatedly change the shooting conditions for the actual shooting while confirming the preparatory shooting image displayed in the display unit 28, and can then press the shutter button when he or she has a chance to take a shot.

When the shutter button is pressed in step S207, the system control unit 50 carries out actual shooting, and records the image from the actual shooting in the recording medium 200, in step S208.

Figure 3:
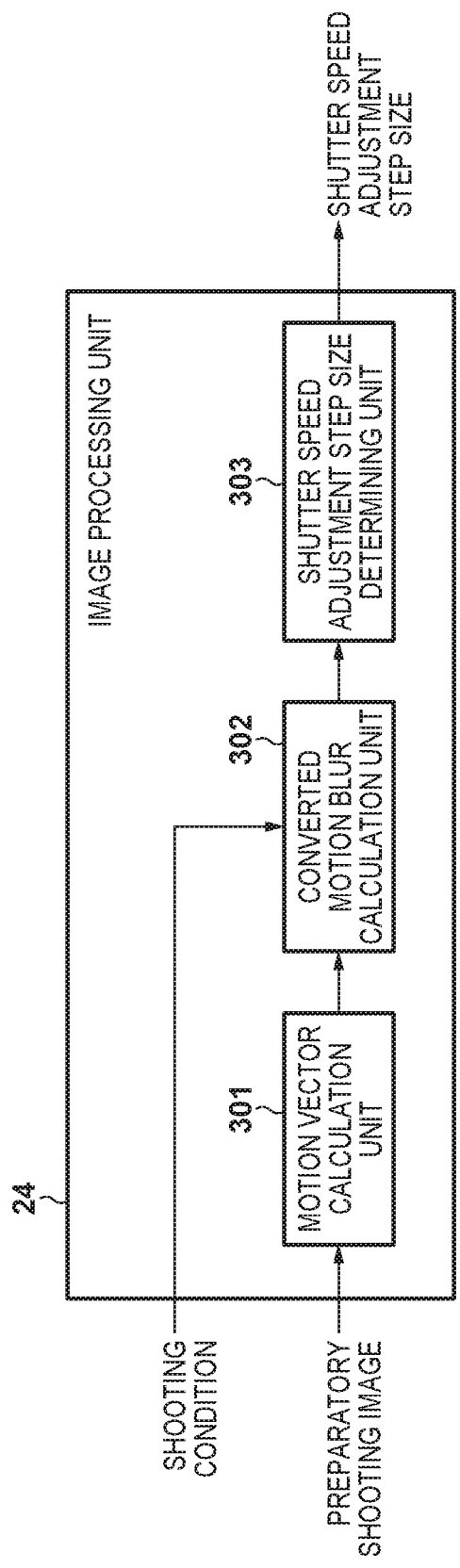
FIG. 3 is a diagram illustrating an example of a configuration for an image processing unit 24 to determine a shutter speed adjustment step size.

An example of a configuration for the image processing unit 24 to determine the shutter speed adjustment step size will be described next with reference to FIG. 3. As illustrated in FIG. 3, the image processing unit 24 includes a motion vector calculation unit 301, a converted motion blur calculation unit 302, and a shutter speed adjustment step size determining unit 303. The operations of each of these units will be described in detail later with reference to FIG. 4. Note that FIG. 3 illustrates only the blocks related to the process for determining the shutter speed adjustment step size, and omits the blocks for carrying out other processes (e.g., the resizing process).

The process through which the image processing unit 24 determines the shutter speed adjustment step size (step S202 in FIG. 2) will be described in detail next with reference to FIG. 4.

In step S401, the image processing unit 24 obtains the preparatory shooting image captured during the preparatory shooting by the image capturing apparatus 100. The obtained preparatory shooting image is input to the motion vector calculation unit 301.

Figure 5A:
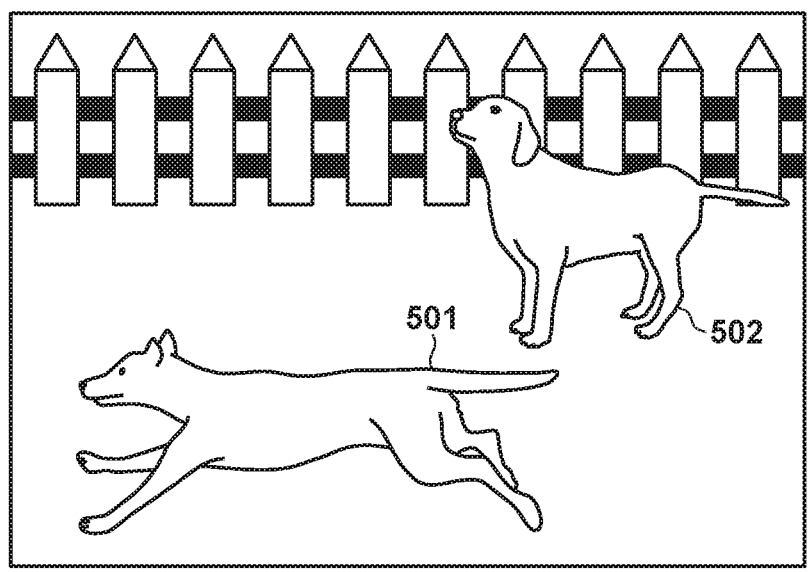
FIG. 5A is a diagram illustrating an example of a preparatory shooting image.

FIG. 5A is a diagram illustrating an example of the preparatory shooting image. The present embodiment will describe an example in which, as illustrated in FIG. 5A, a scene is shot in which a dog 501 is running to the left and a dog 502 is standing still.

In step S402, the motion vector calculation unit 301 calculates a motion vector between the preparatory shooting images as motion information. A "motion vector" expresses horizontal and vertical direction movement amounts of an object between preparatory shooting images as a vector. The method for calculating the motion vector will be described in detail later with reference to FIGS. 6 and 7.

FIG. 6 is a flowchart illustrating the motion vector calculation process carried out by the motion vector calculation unit 301 (step S402 in FIG. 4). Although the present embodiment will describe a block matching method as an example of the method for calculating the motion vector, the method for calculating the motion vector is not limited to this example, and may be gradient method instead, for example.

In step S601, the motion vector calculation unit 301 obtains two preparatory shooting images adjacent with respect to time. The motion vector calculation unit 301 then sets the preparatory shooting image from an Mth frame as a base frame, and sets the preparatory shooting image from an M+1th frame as a reference frame.

As illustrated in FIG. 7, in step S602, the motion vector calculation unit 301 arranges a base block 702, made up of N×N pixels, in a base frame 701.

Also as illustrated in FIG. 7, in step S603, the motion vector calculation unit 301 sets pixels (N+n)×(N−n), which surround coordinates 704 that match the center coordinates of the base block 702 in the base frame 701, in a reference frame 703 as a search range 705.

In step S604, the motion vector calculation unit 301 calculates the correlation between the base block 702 in the base frame 701, and an N×N-pixel reference block 706 at coordinates present within the search range 705 in the reference frame 703, to calculate a correlation value. The correlation value is calculated on the basis of an inter-frame difference absolute value sum for the pixels in the base block 702 and the reference blocks 706. In other words, the coordinates where the value of the inter-frame difference absolute value sum is lowest are the coordinates where the correlation value is the highest. Note that the method for calculating the correlation value is not limited to a method that finds the inter-frame difference absolute value sum, and may instead be a method for calculating the correlation value on the basis of an inter-frame difference sum of squares, a normal cross-correlation value, or the like, for example. The example in FIG. 7 indicates that the reference blocks 706 has the highest correlation.

In step S605, the motion vector calculation unit 301 calculates the motion vector on the basis of the reference block coordinates indicating the highest correlation value found in step S604. In the example in FIG. 7, the motion vector is found on the basis of the coordinates 704 corresponding to the center coordinates of the base block 702 in the base frame 701, and the center coordinates of the reference block 706, in the search range 705 of the reference frame 703. In other words, the inter-coordinate distance and direction, from the coordinates 704 to the center coordinates of the reference block 706, are found as the motion vector.

In step S606, the motion vector calculation unit 301 determines whether or not a motion vector has been calculated for all of the pixels in the base frame 701. If the motion vector calculation unit 301 has determined in step S606 that a motion vector has not been calculated for all of the pixels, the process returns to step S602, whereas if the motion vector calculation unit 301 has determined that a motion vector has been calculated for all of the pixels, the process returns to the flowchart of FIG. 4.

When the process returns to step S602, the motion vector calculation unit 301 arranges an N×N-pixel base block 702 in the aforementioned base frame 701, central to a pixel for which a motion vector has not yet been calculated. The processing from steps S603 to S605 is then carried out in the same manner as described earlier. In other words, the motion vector calculation unit 301 calculates motion vectors for all of the pixels in the base frame 701 by repeating the processing from steps S602 to S605 while moving the base block 702 in FIG. 7.

Figure 5B:
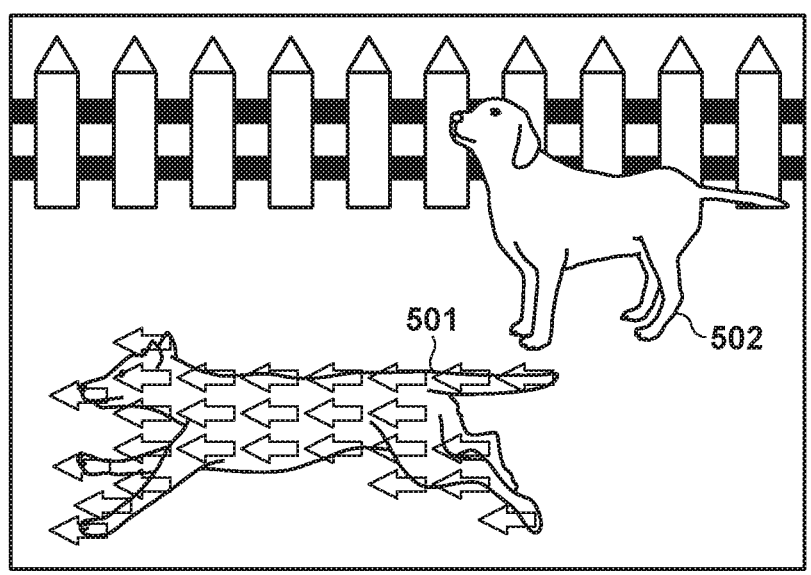
FIG. 5B is a diagram illustrating an example of motion vectors in a preparatory shooting image according to a first embodiment.

FIG. 5B illustrates an example of the motion vectors calculated in this manner. FIG. 5B is a diagram illustrating an example of motion vectors in the preparatory shooting image indicated in FIG. 5A. The preparatory shooting image in FIG. 5A is an example in which the dog 501 is running to the left. FIG. 59 illustrates an example of the motion vectors in the case where an object is moving in this manner. In the example illustrated in FIG. 513, leftward motion vectors are detected in the region corresponding to the running dog 501, whereas "0" is detected as the motion vectors in other regions, such as the dog 502 that is standing still, the fence in the background, and so on. The motion vectors of "0" are not illustrated.

Note that the motion vector calculation unit 301 may calculate a motion vector every predetermined number of pixels instead of calculating motion vectors for all of the pixels. Alternatively, the motion vector calculation unit 301 may divide the image into a plurality of blocks and calculate a motion vector for each block.

The motion vector calculation unit 301 calculates the motion vectors between preparatory shooting images adjacent with respect to time through the foregoing processing.

Returning to FIG. 4, in step S403, the converted motion blur calculation unit 302 obtains the shutter speed (exposure time) for the actual shooting, and the time interval between the images in the preparatory shooting, as the shooting conditions. Note that the shutter speed (exposure time) for the actual shooting was set in advance, but may have been changed to a value, which is different from the value set in advance, due to the processing in step S205 of FIG. 2.

In step S404, the converted motion blur calculation unit 302 converts the motion vectors for each pixel, calculated in step S402, into motion blur in the actual shooting, on the basis of the exposure time for the actual shooting and the time interval between the images in the preparatory shooting, which were obtained in step S403. The method for converting the motion vectors from the preparatory shooting into the motion blur in the actual shooting will be described in detail with reference to FIG. 8.

FIG. 8 is a diagram illustrating a motion vector in preparatory shooting, and motion blur, in actual shooting, converted from the motion vector in the preparatory shooting (converted motion blur). FIG. 8 illustrates an example in which the time interval between the images in the preparatory shooting is 1/60 seconds, and the exposure time in the actual shooting is 1/30 seconds.

The converted motion blur calculation unit 302 converts the motion vector for each pixel into motion blur in the actual shooting on the basis of the following conversion equations (1) and (2).

$$CONV\_GAIN = EXP\_TIME/INT\_TIME \quad (1)$$

$$CONV\_BLUR = VEC\_LEN \times CONV\_GAIN \quad (2)$$

Here, in Equation (1), CONV_GAIN represents a conversion gain for converting the motion vector in the preparatory shooting into a motion vector in the actual shooting, EXP_TIME represents the exposure time in the actual shooting, and INT_TIME represents the time interval between images in the preparatory shooting. In Equation (2), CONV_BLUR represents the converted motion blur in the actual shooting, and VEC_LEN indicates the length of the motion vector in the preparatory shooting.

In Equation (1), the conversion gain CONV_GAIN is calculated by dividing the exposure time EXP_TIME in the actual shooting by the time interval INT_TIME between images in the preparatory shooting. In Equation (2), the converted motion blur CONV_BLUR in the actual shooting is calculated by multiplying the length VEC_LEN of the motion vector by the conversion gain CONV_GAIN.

Specifically, as illustrated in FIG. 8, when the length VEC_LEN of the motion vector in the preparatory shooting is 8 pixels and the exposure time EXP_TIME in the actual shooting is 1/30 seconds, the conversion gain CONV_GAIN is 2×, and thus the converted motion blur is 16 pixels.

Returning to FIG. 4, in step S405, the shutter speed adjustment step size determining unit 303 determines the shutter speed adjustment step size on the basis of the converted motion blur amount calculated in step S404.

The method for determining the shutter speed adjustment step size will be described in detail with reference to FIG. 9. FIG. 9 is a diagram illustrating a relationship between a current shutter speed corresponding to the converted motion blur and a shutter speed corresponding to a target motion blur, FIG. 9 illustrates an example in which the converted motion blur in the actual shooting is 16 pixels, and the target motion blur for showing substantially no blur is 2 pixels. Although the converted motion blur in the actual shooting is extracted on a pixel-by-pixel basis, the maximum value among those extracted is used in the subsequent calculations. In other words, the converted motion blur corresponding to the maximum motion amount detected at each of a plurality of positions within a shot range is used to determine the adjustment step size.

The shutter speed adjustment step size determining unit 303 determines the shutter speed for achieving the target motion blur (a target shutter speed) on the basis of the conversion formulas indicated by the following Equations (3) and (4).

$$CONV\_GAIN = TARGET\_BLUR/CONV\_BLUR \quad (3)$$

$$TARGET\_TIME = EXP\_TIME \times CONV\_GAIN \quad (4)$$

In Equation (3), CONV_GAIN represents a conversion gain for converting the converted motion blur into the target motion blur, CONV_BLUR represents the converted motion blur, and TARGET_BLUR represents the target motion blur. In Equation (4), TARGET_TIME represents the shutter speed for achieving the target motion blur (the target shutter speed), and EXP_TIME represents the shutter speed for the actual shooting (the shutter speed currently set).

Specifically, when the shutter speed EXP_TIME for the actual shooting is 1/30 seconds and the target motion blur is 2 pixels as illustrated in FIG. 9, the conversion gain is 1/8×, which means that the target shutter speed TARGET_TIME is 1/250 seconds. Strictly speaking, according to Equation (4), the target shutter speed TARGET_TIME is 1/30 seconds× 1/8=1/240 seconds. However, the shutter speed can only be set to discrete values in the image capturing apparatus 100, and thus 1/250 seconds, which can be set in the image capturing apparatus 100 and is close to 1/240 seconds, is selected. The shutter speed adjustment step size determining unit 303 then sets the shutter speed adjustment step size to an adjustment step size in which the shutter speed can be changed directly from 1/30 seconds to 1/250 seconds (three steps, in the example illustrated in FIG. 9). This makes it possible to set the shutter speed to the target shutter speed with a fewer number of user operations than when changing the shutter speed at the normal adjustment step size (e.g. one step), which in turn makes it possible to shorten the time required for shooting preparations.

According to the foregoing descriptions, the shutter speed adjustment step size determining unit 303 determines the shutter speed adjustment step size after the target shutter speed is calculated according to Equations (3) and (4). However, substantially speaking, the shutter speed adjustment step size determining unit 303 can determine the shutter speed adjustment step size according to Equation (3), without using Equation (4). In the example illustrated in FIG. 9, the conversion gain CONV_GAIN for converting the converted motion blur to the target motion blur is 1/8×. In this case, it is sufficient for the shutter speed adjustment step size determining unit 303 to set the shutter speed adjustment step size to an adjustment step size at which the current shutter speed can be changed directly to 1/8× (three steps). However, as mentioned above, the shutter speed can only be set to discrete values in the image capturing apparatus 100. Thus to be more precise, the shutter speed adjustment step size determining unit 303 may determine the adjustment step size so that when a user operation for increasing the shutter speed has been made, the shutter speed for the actual shooting can be changed directly to approximately (target motion blur)/(converted motion blur) times. The range indicated by "approximately" is set as appropriate in accordance with the shutter speed values that can be set in the image capturing apparatus 100. Note that the shutter speed is faster the lower the value is, and thus changing the shutter speed to less than 1× is equivalent to increasing the shutter speed.

The shutter speed adjustment step size determining unit 303 may determine the shutter speed adjustment step size to a value lower than the adjustment step size at which the current shutter speed can be changed directly to the target shutter speed. Even in this case, determining the shutter speed adjustment step size on the basis of the difference between the converted motion blur and the target motion blur, which is lower than the converted motion blur, snakes it possible to change the shutter speed at an adjustment step size that is based on motion blur in the object, which improves the operability for the user.

According to the first embodiment as described thus far, the image capturing apparatus 100 detects the motion amount of an object from an image obtained through preparatory shooting, and converts the motion amount to a motion blur amount arising during actual shooting. Additionally, the image capturing apparatus 100 determines the shutter speed adjustment step size on the basis of a difference between the motion blur amount and the target motion blur amount, which is lower than the motion blur amount. This makes it possible to change the shutter speed at an adjustment step size that is based on motion blur in the object.

Note that a configuration may be employed in which an operation for changing the shutter speed at the normal adjustment step size (a shutter speed adjustment step size determined in advance independently of the preparatory shooting) can also be made, in addition to the operation for changing the shutter speed at the adjustment step size determined in step S202 of FIG. 2. For example, the image capturing apparatus 100 can be configured so that, by making settings through the menu screen in advance, the adjustment step size determined in step S202 of FIG. 2 and the normal adjustment step size (e.g., one step) are assigned to two different operation members included in the operation unit 70. In this case, the shutter speed is changed at the normal adjustment step size in step S205 in response to the operation member to which the normal adjustment step size has been assigned being manipulated in step S203.

Additionally, although the present embodiment describes a configuration in which the shutter speed adjustment step size is determined on the basis of the maximum value for the converted motion blur extracted on a pixel-by-pixel basis, the converted motion blur used as the basis is not limited thereto. For example, a configuration may be employed in which the shutter speed adjustment step size is determined having excluded the converted motion blur, of the converted motion blur extracted on a pixel-by-pixel basis, for which the percentage occupying the overall screen is less than or equal to a predetermined percentage. Additionally, a configuration may be employed in which the shutter speed adjustment step size is determined on the basis of the converted motion blur Value that appears most frequently in the overall screen (the mode value).

Furthermore, although the present embodiment describes a configuration in which motion vectors are detected for the overall screen, the configuration is not limited thereto. For example, a configuration may be employed in which a known primary object detection technique is used to detect only the motion vectors in the vicinity of the primary object.

The present embodiment describes a configuration in which the motion amount of an object is detected from an image obtained through preparatory shooting, and by converting that motion amount to a motion blur amount that will arise in the actual shooting, the motion blur amount that will arise in the actual shooting is estimated. However, the method for estimating the motion blur amount that will arise in the actual shooting is not limited thereto. Additionally, the two instances of shooting, i.e., the preparatory shooting and the actual shooting, may be any two types of shooting (first shooting and second shooting). For example, the image capturing apparatus 100 may obtain a first shot image obtained through the first shooting at a first shutter speed, and motion information of an object in the first shot image. The motion information obtained here is the speed of the object in the first shot image (e.g., a movement amount in a unit of time, expressed as a number of pixels). Then, on the basis of the motion information and a second shutter speed, the image capturing apparatus 100 may estimate a first motion blur amount of the object in a second shot image obtained when the second shooting is carried out at the second shutter speed. The second shutter speed is set independently from the first shutter speed. This point also applies to the second embodiment and the third embodiment, which will be described hereinafter.

Second Embodiment

The second embodiment will describe a configuration in which a converted motion blur amount (the motion blur amount arising in the actual shooting) is obtained for each of a plurality of objects, and the shutter speed adjustment step size is determined with a plurality of steps on the basis of the difference between the converted motion blur amount for each object and a target motion blur amount. In the second embodiment, the basic configuration of the image capturing apparatus 100 is the same as in the first embodiment (see FIGS. 1A, 1B, and 3). Additionally, although the shooting process executed by the image capturing apparatus 100 according to the present embodiment is the same as that in the first embodiment (see FIG. 3), the details of the process for determining the shutter speed adjustment step size (FIG. 4) are different from those in the first embodiment. The following will primarily describe points that are different from the first embodiment.

The process for determining the shutter speed adjustment step size according to the second embodiment will be described in detail with reference to FIG. 4. The processes of steps S401 to S404 are the same as those described in the first embodiment.

In step S405, the shutter speed adjustment step size determining unit 303 determines the shutter speed adjustment step size on the basis of the converted motion blur amount calculated in step S404. In the first embodiment, a single specific value (e.g., the maximum value among the converted motion blur amounts extracted on a pixel-by-pixel basis) was used as the converted motion blur amount used to determine the adjustment step size. However, in the second embodiment, the shutter speed adjustment step size determining unit 303 determines the shutter speed adjustment step size with a plurality of steps by using a plurality of converted motion blur amounts corresponding to the plurality of objects.

The process of step S405 according to the second embodiment will be described in detail with reference to FIGS. 5A, 10, 11, and 12. FIG. 5A is a diagram illustrating an example of the preparatory shooting image. The present embodiment will describe an example in which, as illustrated in FIG. 5,4, a scene is shot in which a dog 501 is running to the left and a dog 502 is standing still. FIG. 10 illustrates an example of motion vectors in this preparatory shooting image. In the example illustrated in FIG. 10, a leftward motion vector 1003 or motion vector 1004 is detected at each position in the running dog 501. "0" is detected as the motion vector in other areas, such as the dog 502 that is standing still, the fence in the background, and so on. The motion vectors of "0" are not illustrated. The motion vectors 1003 indicated by the white arrows correspond to the movement of the entire body of the dog 501 (excluding the leg areas). However, the motion vectors 1004 indicated by the hatched arrows correspond to the movement of the leg areas of the dog 501. In this example, the motion vectors 1004 have higher values than the motion vectors 1003. According to the example illustrated in FIG. 10, the shutter speed adjustment step size determining unit 303 determines the shutter speed adjustment step size with two steps by using two converted motion blur amounts corresponding to two objects, the two objects being the entire body of the dog 501 (excluding the leg areas) and the leg areas.

Figure 11:
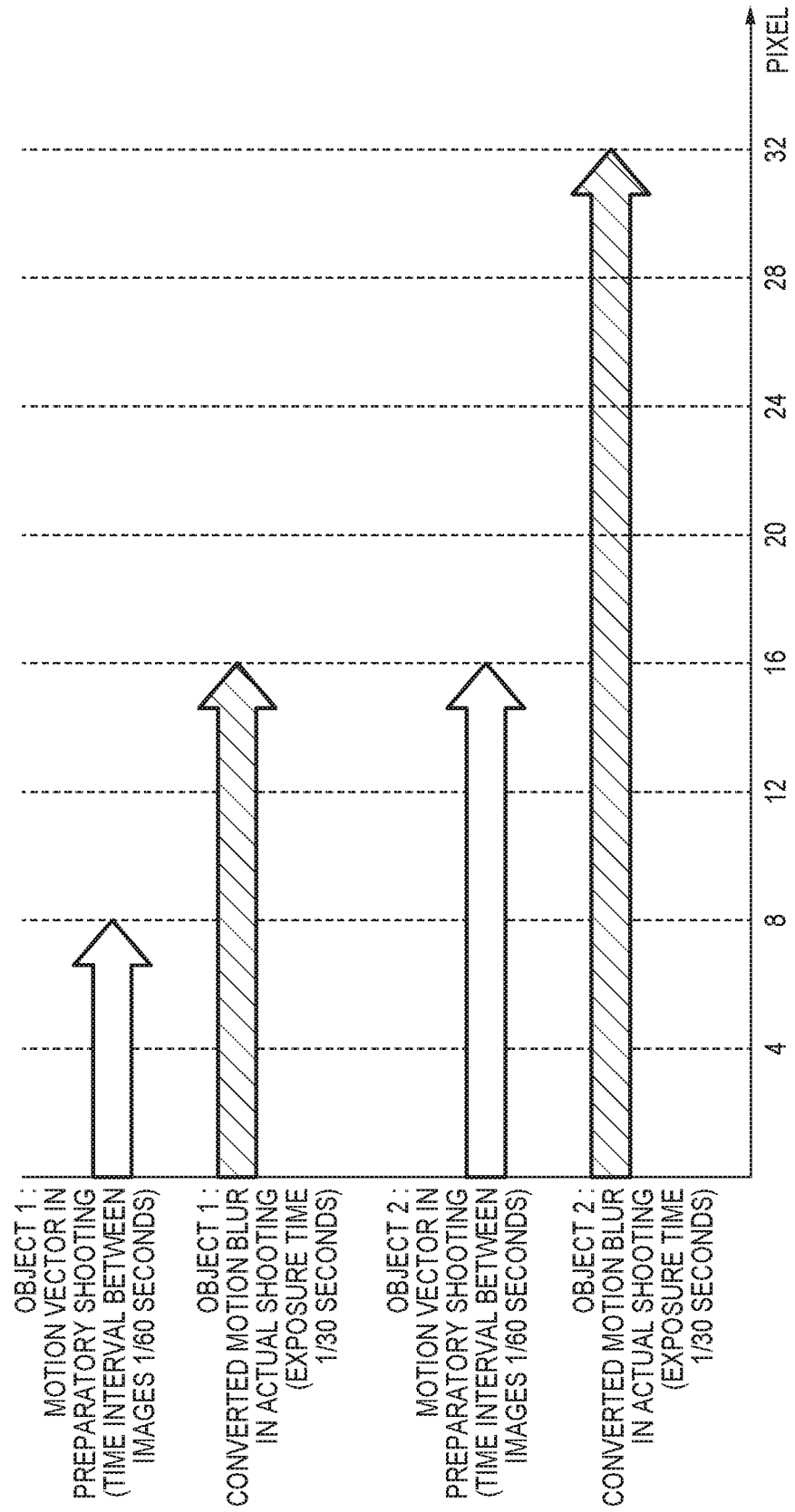
FIG. 11 is a diagram illustrating a motion vector in preparatory shooting, and motion blur, in actual shooting, converted from the motion vector in the preparatory shooting (converted motion blur), according to the second embodiment.

FIG. 11 is a diagram illustrating a motion vector in preparatory shooting, and motion blur, in actual shooting, converted from the motion vector in the preparatory shooting (converted motion blur). Like FIG. 8 described in the first embodiment, FIG. 11 illustrates an example in which the time interval between the images in the preparatory shooting is $\frac{1}{60}$ seconds, and the exposure time in the actual shooting is $\frac{1}{30}$ seconds. However, unlike FIG. 8, FIG. 11 illustrates motion vectors in the preparatory shooting and the converted motion blur for each of an object 1, which corresponds to the entire body of the dog 501 (excluding the leg areas), and an object 2, which corresponds to the leg areas of the dog 501. In other words, the motion vectors of the object 1 correspond to the motion vectors 1003 in FIG. 10, and the motion vectors of the object 2 correspond to the motion vectors 1004 in FIG. 10.

According to Equations (1) and (2), when the length of the motion vectors of the object 1 in the preparatory shooting is 8 pixels and the exposure time for the actual shooting is $\frac{1}{30}$ seconds, the conversion gain is 2×, resulting in a converted motion blur of 16 pixels. Likewise, when the length of the motion vectors of the object 2 in the preparatory shooting is 16 pixels and the exposure time for the actual shooting is $\frac{1}{30}$ seconds, the conversion gain is 2×, resulting in a converted motion blur of 32 pixels.

Figure 12:
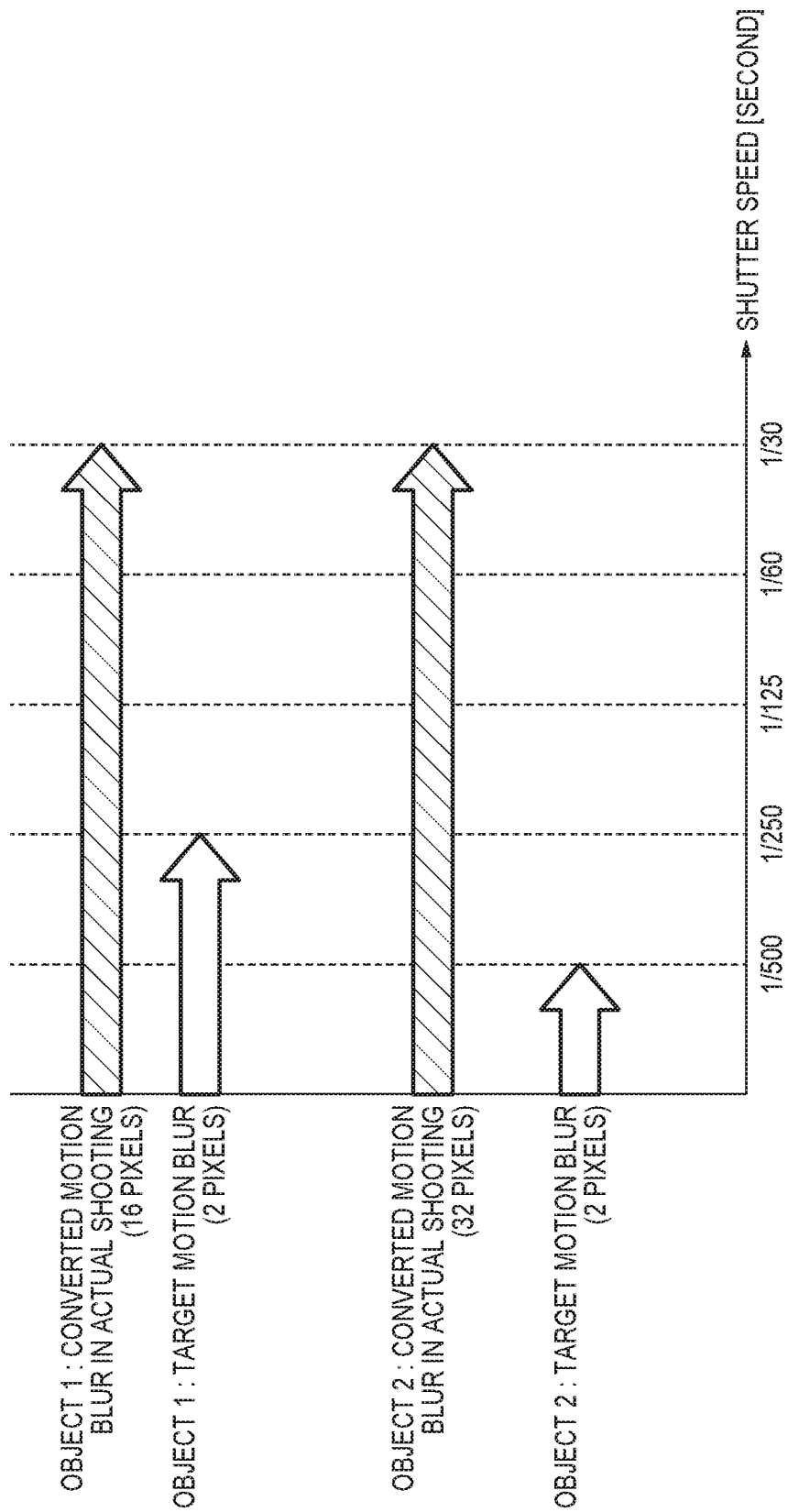
FIG. 12 is a diagram illustrating a relationship between a current shutter speed corresponding to the converted motion blur and a shutter speed corresponding to the target motion blur, according to the second embodiment.

FIG. 12 is a diagram illustrating a relationship between a current shutter speed corresponding to the converted motion blur and a shutter speed corresponding to a target motion blur. Unlike FIG. 9 described in the first embodiment, FIG. 12 illustrates a shutter speed for achieving the target motion blur for each of two converted motion blurs, which correspond to the two respective objects. The method for determining the shutter speed for achieving the target motion blur for each of the objects is the same as that described in the first embodiment, and thus Equations (3) and (4) are used. In the example illustrated in FIG. 12, the converted motion blur of the object 1 is 16 pixels, the converted motion blur of the object 2 is 32 pixels, and the target motion blur for showing substantially no blur is 2 pixels. When the shutter speed for the actual shooting of the object 1 is $\frac{1}{30}$ seconds and the target motion blur is 2 pixels, the conversion gain is $\frac{1}{8}\times$, and thus the shutter speed for achieving the target motion blur is $\frac{1}{250}$ seconds. Likewise, when the shutter speed for the actual shooting of the object 2 is $\frac{1}{30}$ seconds and the target motion blur is 2 pixels, the conversion gain is $\frac{1}{16}\times$, and thus the shutter speed for achieving the target motion blur is $\frac{1}{500}$ seconds.

Here, the shutter speed adjustment step size determining unit 303 sets a first shutter speed adjustment step size to an adjustment step size in which the shutter speed can be changed directly from $\frac{1}{30}$ seconds to $\frac{1}{250}$ seconds (three steps, in the example illustrated in FIG. 12). Additionally, the shutter speed adjustment step size determining unit 303 sets a second shutter speed adjustment step size to an adjustment step size in which the shutter speed can be changed directly from $\frac{1}{250}$ seconds to $\frac{1}{500}$ seconds (one step, in the example illustrated in FIG. 12). Thus according to the present embodiment, in step S205 of FIG. 2, the system control unit 50 changes the shutter speed for the actual shooting at the first adjustment step size in response to the operation member for changing the shutter speed being manipulated for the first time. Then, the system control unit 50 changes the shutter speed for the actual shooting, which was changed at the first adjustment step size, again at the second adjustment step size in response to the same operation member being manipulated again.

This makes it possible to set the shutter speed to a shutter speed that achieves the target motion blur with a fewer number of user operations than when changing the shutter speed at the normal adjustment step size (e.g., one step), which in turn makes it possible to shorten the time required for shooting preparations. This also makes it possible for the user to easily select whether to set the shutter speed only for preventing motion blur in the object 1, or to set the shutter speed for preventing motion blur in the object 2, which has a greater motion amount than the object 1, as well.

As in the first embodiment, substantially speaking, the shutter speed adjustment step size determining unit 303 can determine the shutter speed adjustment step size with a plurality of steps according to Equation (3), without using Equation (4). In the example illustrated in FIG. 12, the conversion gain CONV_GAIN for converting the converted motion blur into the target motion blur for the object 1 is ⅛×, and the conversion gain CONV_GAIN for converting the converted motion blur into the target motion blur for the object 2 is 1/16×. In this case, it is sufficient for the shutter speed adjustment step size determining unit 303 to set the first adjustment step size of the shutter speed to an adjustment step size at which the current shutter speed can be changed directly to ⅛× (three steps). Likewise, it is sufficient for the shutter speed adjustment step size determining unit 303 to set the second adjustment step size of the shutter speed to an adjustment step size at which the current shutter speed that has been changed to ⅛× can be changed directly to ½× (one step). Here, the ½× corresponding to the second adjustment step size is obtained by dividing the conversion gain CONV_GAIN (1/16×) for converting the converted motion blur into the target motion blur for the object 2 by the ⅛× corresponding to the first adjustment step size. In other words, the second adjustment step size can be determined on the basis of the difference between the converted motion blur and the target motion blur for the object 2, and the first adjustment step size.

According to the second embodiment described thus far, the image capturing apparatus 100 obtains a converted motion blur amount for each of a plurality of objects, and determines the shutter speed adjustment step size with a plurality of steps on the basis of the difference between the converted motion blur amount for each object and a target motion blur amount. This makes it possible to easily select whether to set the shutter speed only for preventing motion blur in a slow object, or to set the shutter speed for preventing motion blur in a fast object as well as the slow object.

Although the present embodiment describes a configuration in which the shutter speed is changed in steps in accordance with a shutter speed adjustment step size having a plurality of steps, the configuration described in the first embodiment may be added to this configuration. In other words, in addition to the shutter speed adjustment step size having a plurality of steps, the shutter speed adjustment step size determining unit 303 may determine an adjustment step size at which the current shutter speed can be changed directly to a target shutter speed corresponding to the object having the most motion blur. This adjustment step size corresponds to the total of the aforementioned first adjustment step size and second adjustment step size. In the example illustrated in FIG. 12, the object having the most motion blur is the object 2, and the adjustment step size at which the current shutter speed can be changed directly to the target shutter speed corresponding to the object 2 is 1/16 (four steps). In this case, a function for changing the shutter speed may be assigned to two operation members included in the operation unit 70, and different adjustment step sizes may be assigned to the respective operation members. For example, the function for changing the shutter speed at an adjustment step size having a plurality of steps may be assigned to the main electronic dial 71. On the other hand, the function for changing the shutter speed at the adjustment step size at which the current shutter speed can be changed directly to the target shutter speed corresponding to the object 2 may be assigned to the sub electronic dial 73.

Third Embodiment

The third embodiment will describe a configuration in which, when taking what is known as a "panning shot," different shutter speed adjustment step sizes are determined for a direction in which to increase the shutter speed and for a direction in which to reduce the shutter speed. In the third embodiment, the basic configuration of the image capturing apparatus 100 is the same as in the first embodiment (see FIGS. 1A, 1B, and 3). Additionally, although the shooting process executed by the image capturing apparatus 100 according to the present embodiment is the same as that in the first embodiment (see FIG. 3), the details of the process for determining the shutter speed adjustment step size (FIG. 4) are different from those in the first embodiment. The following wilt primarily describe points that are different from the first embodiment.

In the present embodiment, the attitude detection unit 55 (FIG. 1B) includes a gyrosensor, for example, which detects the angular velocity of the image capturing apparatus 100 in the yaw direction and the pitch direction, produced by hand shake or camera work. Any desired known method can be used as the method by which the attitude detection unit 55 detects the angular velocity. For example, based on a known standard for determining a panning mode, the image capturing apparatus 100 can determine that the actual shooting will be carried out in a panning mode when the output of the attitude detection unit 55 is greater than or equal to a predetermined value.

The process for determining the shutter speed adjustment step size according to the third embodiment will be described in detail with reference to FIG. 4. The processes of steps S401 to S404 are the same as those described in the first embodiment.

In step S405, the shutter speed adjustment step size determining unit 303 determines the shutter speed adjustment step size on the basis of the converted motion blur amount calculated in step S404. In the first embodiment, a single specific value (e.g., the maximum value among the converted motion blur amounts extracted on a pixel-by-pixel basis) was used as the converted motion blur amount used to determine the adjustment step size. However, in the third embodiment, the shutter speed adjustment step size determining unit 303 determines two adjustment step sizes by using two converted motion blur amounts, one corresponding to a specific object, and the other corresponding to a panned background (the background moving in the opposite direction from the direction in which the image capturing apparatus 100 is moving).

Figure 13:
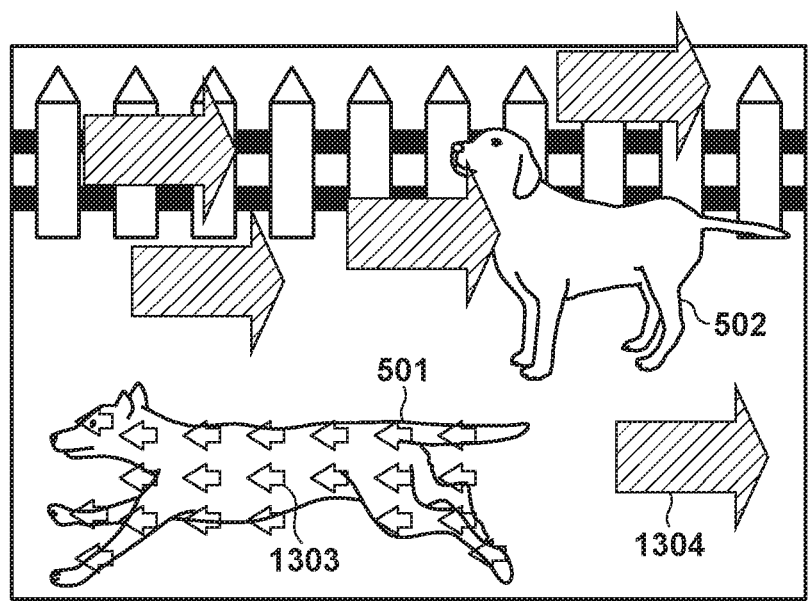
FIG. 13 is a diagram illustrating an example of motion vectors in a preparatory shooting image according to a third embodiment.

The process of step S405 according to the third embodiment will be described in detail with reference to FIGS. 5A, 13, 14, and 15. FIG. 5A is a diagram illustrating an example of the preparatory shooting image. The present embodiment will describe an example in which, as illustrated in FIG. 5A, a scene in which a dog 501 is running to the left and a dog 502 is standing still is shot in a panning mode. Here, the direction of the panning (the direction in which the image capturing apparatus 100 is moving) is assumed to be the left. Thus in this preparatory shooting, the background is moving to the right (the direction opposite from the direction in which the image capturing apparatus 100 is moving). FIG. 13 illustrates an example of motion vectors in this preparatory shooting image. In the example illustrated in FIG. 13, a leftward motion vector 1303 is detected at the position of the running dog 501. A rightward motion vector 1304 is detected at other areas, such as the dog 502, the fence (background areas), and so on. The motion vectors 1303 indicated by the white arrows correspond to the movement of the dog 501. However, the motion vectors 1304 indicated by the hatched arrows correspond to the movement of the background (relative movement with respect to the image capturing apparatus 100).

Figure 14:
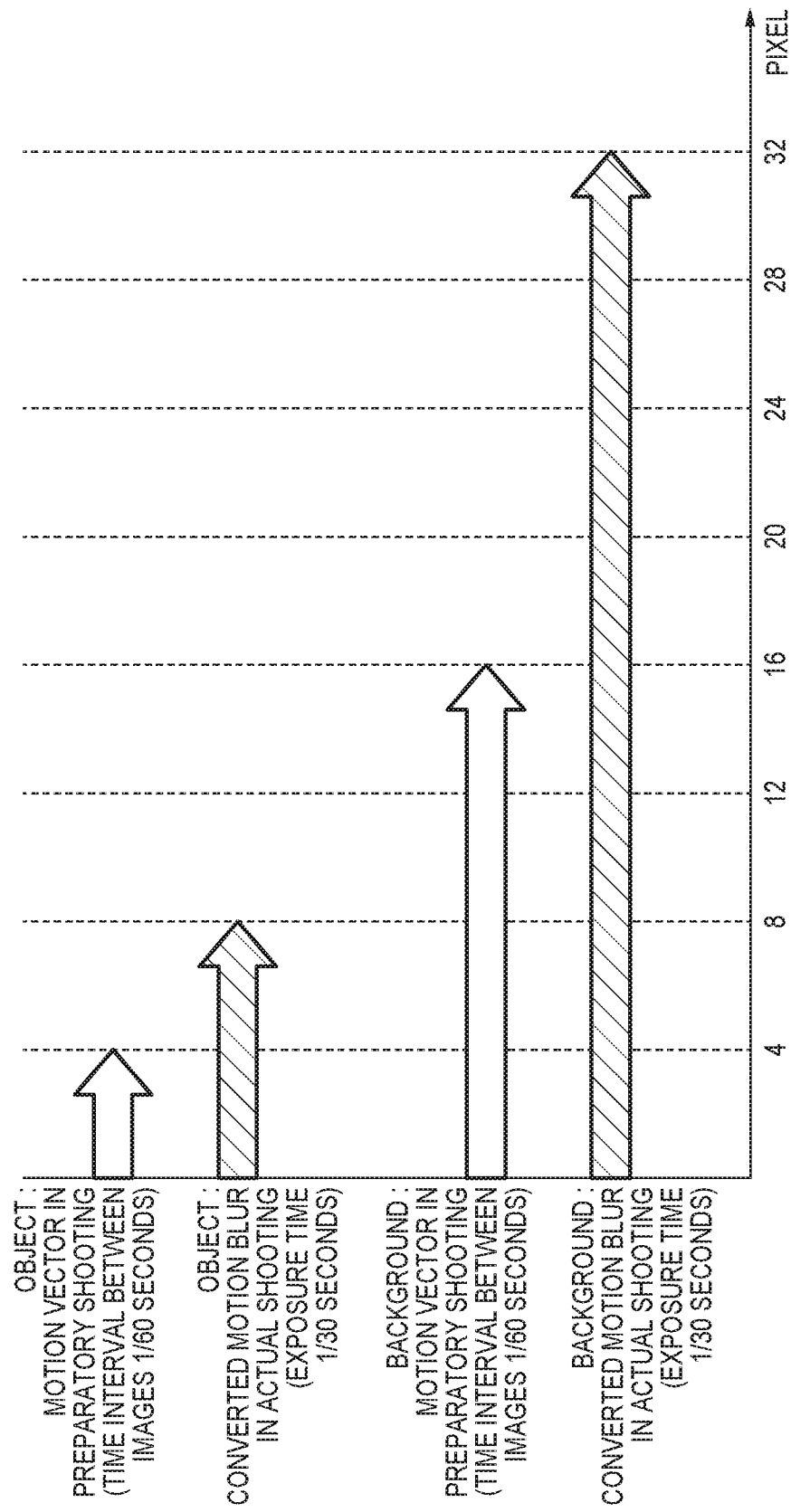
FIG. 14 is a diagram illustrating a motion vector in preparatory shooting, and motion blur, in actual shooting, converted from the motion vector in the preparatory shooting (converted motion blur), according to the third embodiment.

FIG. 14 is a diagram illustrating a motion vector in preparatory shooting, and motion blur, in actual shooting, converted from the motion vector in the preparatory shooting (converted motion blur). Like FIG. 8 described in the first embodiment, FIG. 14 illustrates an example in which the time interval between the images in the preparatory shooting is 1/60 seconds, and the exposure time in the actual shooting is 1/30 seconds. However, unlike FIG. 8, FIG. 14 illustrates motion vectors in the preparatory shooting and the converted motion blur for an object corresponding to the dog 501, and for the background. In other words, the motion vectors of the object correspond to the motion vectors 1303 in FIG. 13, and the motion vectors of the background correspond to the motion vectors 1304 in FIG. 13.

According to Equations (1) and (2), when the length of the motion vectors of the object in the preparatory shooting is 4 pixels and the exposure time for the actual shooting is 1/30 seconds, the conversion gain is 2×, resulting in a converted motion blur of 8 pixels. Likewise, when the length of the motion vectors of the background in the preparatory shooting is 16 pixels and the exposure time for the actual shooting is 1/30 seconds, the conversion gain is 2×, resulting in a converted motion blur of 32 pixels.

Figure 15:
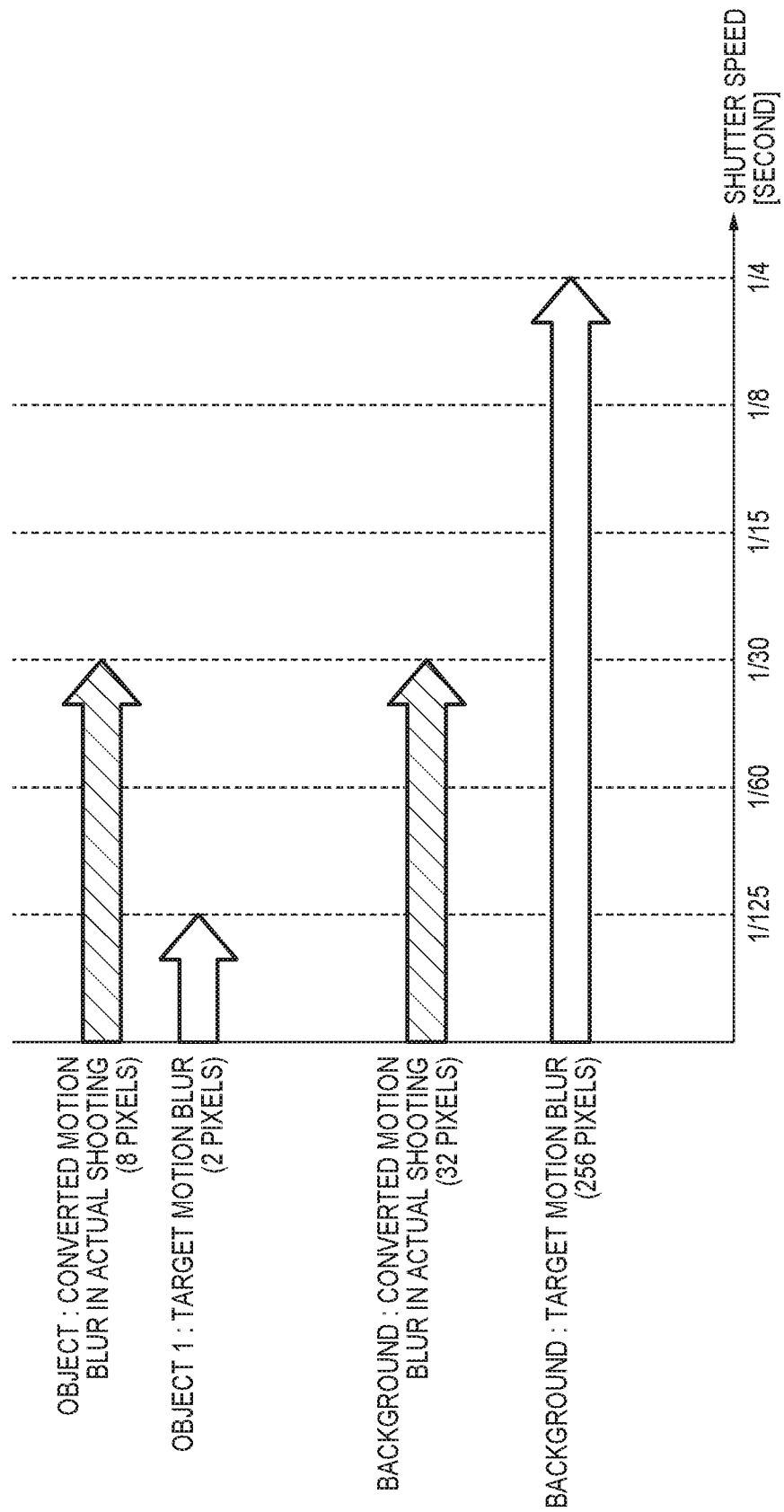
FIG. 15 is a diagram illustrating a relationship between a current shutter speed corresponding to the converted motion blur and a shutter speed corresponding to the target motion blur, according to the third embodiment.

FIG. 15 is a diagram illustrating a relationship between a current shutter speed corresponding to the converted motion blur and a shutter speed corresponding to a target motion blur. Unlike FIG. 9 described in the first embodiment, FIG. 15 illustrates a shutter speed for achieving the target motion blur for each of two converted motion blurs, which correspond to the object and the background, respectively. The method for determining the shutter speed for achieving the target motion blur is the same as that described in the first embodiment, and thus Equations (3) and (4) are used. However, in the present embodiment, different target motion blurs are used for the object and for the background. A target motion blur for showing substantially no blur (a first target motion blur amount) is used for the object, in the same manner as in the first embodiment. On the other hand, a target motion blur that gives the appearance of a full amount of blur (a second target motion blur amount) is used for the background. In the example illustrated in FIG. 15, the converted motion blur of the object is 8 pixels, the converted motion blur of the background is 32 pixels, the target motion blur for showing substantially no blur is 2 pixels, and the target motion blur that gives the appearance of a full amount of blur is 256 pixels. When the shutter speed for the actual shooting of the object is 1/30 seconds and the target motion blur is 2 pixels, the conversion gain is 1/4×, and thus the shutter speed for achieving the target motion blur is 1/125 seconds. Likewise, when the shutter speed for the actual shooting of the background is 1/30 seconds and the target motion blur is 256 pixels, the conversion gain is 8×, and thus the shutter speed for achieving the target motion blur is 1/4 seconds.

Here, the shutter speed adjustment step size determining unit 303 sets the adjustment step size for the direction in which to increase the shutter speed to an adjustment step size in which the shutter speed can be changed directly from 1/30 seconds to 1/125 seconds (two steps, in the example illustrated in FIG. 15). Additionally, the shutter speed adjustment step size determining unit 303 sets the adjustment step size for the direction in which to reduce the shutter speed to an adjustment step size in which the shutter speed can be changed directly from 1/30 seconds to 1/4 seconds (three steps, in the example illustrated in FIG. 15). Thus in the present embodiment, different adjustment step sizes are used in step S205 of FIG. 2, depending on whether the operation member for changing the shutter speed has been manipulated in a direction that increases the shutter speed or in a direction that reduces the shutter speed.

As a result, the shutter speed can be set to a shutter speed that achieves the target motion blur for showing substantially no blur with a fewer number of user operations than when changing the shutter speed at the normal adjustment step size (e.g., one step). Likewise, the shutter speed can be set to the shutter speed that achieves the target motion blur for giving the appearance of a full amount of blur, and the background blur can be emphasized, with a fewer number of user operations than when changing the shutter speed at the normal adjustment step size (e.g., one step). This in turn makes it possible to reduce the amount of time required for shooting preparations.

As in the first embodiment, substantially speaking, the shutter speed adjustment step size determining unit 303 can determine the two adjustment step sizes according to Equation (3), without using Equation (4). In the example illustrated in FIG. 15, the conversion gain CONV_GAIN for converting the converted motion blur into the target motion blur for the object is 1/4×, and the conversion gain CONV_GAIN for converting the converted motion blur into the target motion blur for the background is 8×. In this case, it is sufficient for the shutter speed adjustment step size determining unit 303 to set the adjustment step size for the direction in which to increase the shutter speed to an adjustment step size at which the current shutter speed can be changed directly to 1/4× (two steps). Likewise, it is sufficient for the shutter speed adjustment step size determining unit 303 to set the adjustment step size for the direction in Which to reduce the shutter speed to an adjustment step size at which the current shutter speed can be changed directly to 8× (three steps).

According to the third embodiment as described thus far, the image capturing apparatus 100 determines different shutter speed adjustment step sizes for the direction in which to increase the shutter speed and the direction in which to reduce the shutter speed. For the direction in which to increase the shutter speed, the image capturing apparatus 100 determines the shutter speed adjustment step size on the basis of the difference between the motion blur of an object and a target motion blur that shows substantially no blur. For the direction in which to reduce the shutter speed, the image capturing apparatus 100 determines the shutter speed adjustment step size on the basis of the difference between the motion blur of the background and a target motion blur that gives the appearance of a full amount of blur. This makes it easy to set a shutter speed for preventing motion blur in the object, set a shutter speed for enhancing blur in the background, and so on.

Although the present embodiment describes a configuration in which the shutter speed adjustment step sizes are changed through a single operation both when increasing and reducing the shutter speed, the configuration is not limited thereto. For example, as in the second embodiment, a configuration may be employed in which an adjustment step size is determined so that the shutter speed is changed in steps, when increasing the shutter speed, reducing the shutter speed, or both.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248372, filed Dec. 28, 2018, which is hereby incorporated by reference herein in its entirety.

What is claimed is:

1. An information processing apparatus comprising at least one processor and/or at least one circuit which functions as:
   an acquisition unit configured to acquire a first captured image obtained by first image capturing with a first shutter speed in an image sensor and a first motion amount about an object in the first captured image;
   a setting unit configured to set a second shutter speed;
   an estimation unit configured to estimate a second motion amount of an object in a second captured image which is obtained in a case where second image capturing is performed with the second shutter speed, based on the first motion amount, the first shutter speed, and the second shutter speed;
   a determining unit configured to determine a first shutter speed adjustment step size on the basis of a difference between the second motion amount and a first target motion amount that is lower than the second motion amount; and
   a changing unit configured to change the second shutter speed for the second image capturing at a normal adjustment step size or at the first shutter speed adjustment step size in response to an operation member being operated.

2. The information processing apparatus according to claim 1,
   wherein the determining unit determines the first shutter speed adjustment step size so that the shutter speed for the second shooting is changed to approximately (the first target motion amount)/(the second motion amount) times in a case where the first shutter speed changing unit has been operated in a direction that increases the shutter speed.

3. The information processing apparatus according to claim 1, wherein the processor and/or at least one circuit also functions as:
   a detecting unit that detects a motion amount of an object in the first captured image at a plurality of positions in a shot range; and
   wherein the first motion amount is the greatest of a plurality of motion amounts detected by the detecting unit.

4. The information processing apparatus according to claim 1, wherein the processor and/or at least one circuit also functions as:
   a detecting unit that detects, from the image obtained from the first shooting, a second motion amount of a background moving in the direction opposite from a direction in which an image capturing apparatus carrying out the first shooting is moving;
   a converting unit that converts the second motion amount of a background into a second motion amount that will arise in the second shooting, on the basis of the predetermined intervals of time and the shutter speed used in the second shooting;
   wherein the determining unit determines a second shutter speed adjustment step size on the basis of a difference between the second motion amount and a second target motion amount that is greater than the second motion amount; and
   wherein the changing unit changes the shutter speed for the second shooting at the first shutter speed adjustment step size in response to the first shutter speed changing unit being operated in a direction that increases the shutter speed, and changes the shutter speed for the second shooting at the second shutter speed adjustment step size in response to the first shutter speed changing unit being operated in a direction that reduces the shutter speed.

5. The information processing apparatus according to claim 4,
   wherein the determining unit determines the second shutter speed adjustment step size so that the shutter speed for the second shooting is changed to approximately (the second target motion amount)/(the second motion amount) times in a case where the first shutter speed changing unit has been operated in the direction that reduces the shutter speed.

6. The information processing apparatus according to claim 1,
   wherein the changing unit changes the shutter speed for the second shooting at a third shutter speed adjustment step size, determined in advance independently from the first shooting, in response to a second shutter speed changing unit, which is different from the first shutter speed changing unit, being operated.

7. An information processing apparatus comprising at least one processor and/or at least one circuit which functions as:
- an acquisition unit configured to acquire a first captured image obtained by first image capturing with a first shutter speed in an image sensor, a first motion amount about a first object in the first captured image, and a second motion amount about a second object in the first captured image;
- a setting unit configured to set a second shutter speed;
- an estimation unit configured to estimate a third motion amount of the first object in a second captured image which is obtained in a case where second image capturing is performed with the second shutter speed, based on the first motion amount, the first shutter speed, and the second shutter speed, and to estimate a fourth motion amount of the second object in the second captured image which is obtained in a case where second image capturing is performed with the second shutter speed, based on the second motion amount, the first shutter speed, and the second shutter speed;
- a determining unit configured to determine a first shutter speed adjustment step size on the basis of a difference between the third motion amount and a target motion amount that is lower than the third motion amount, and to determine a second shutter speed adjustment step size on the basis of a difference between the fourth motion amount and the target motion amount, as well as on the basis of the first shutter speed adjustment step size; and
- a changing unit configured to change the second shutter speed for the second image capturing at a normal adjustment step size or at the first shutter speed adjustment step size in response to an operation member being operated, and to further change the second shutter speed for the second image capturing, which had been changed at the first shutter speed adjustment step size, at the second shutter speed adjustment step size in response to the operation member being operated again.

8. An image capturing apparatus comprising:
the information processing apparatus according to claim 1; and
the image sensor.

9. An image capturing apparatus comprising: the information processing apparatus according to claim 7; and the image sensor.

10. The information processing apparatus according to claim 7,
wherein the determining unit determines the first shutter speed adjustment step size so that, in a case where the first shutter speed changing unit has been operated in a direction that increases the shutter speed, the shutter speed for the second shooting is changed to approximately (the target motion amount)/(the third motion amount) times, and determines the second shutter speed adjustment step size so that, in a case where the first shutter speed changing unit has been operated again in the direction that increases the shutter speed, the shutter speed for the second shooting, which has been changed at the first shutter speed adjustment step size, is changed to a value obtained if the shutter speed for the second shooting from before the change at the first shutter speed adjustment step size is changed to approximately (the target motion amount)/(the fourth motion amount) times.

11. The information processing apparatus according to claim 7,
wherein the changing unit changes the shutter speed for the second shooting at a third shutter speed adjustment step size corresponding to a total of the first shutter speed adjustment step size and the second shutter speed adjustment step size in response to a second shutter speed changing unit, which is different from the first shutter speed changing unit, being operated.

12. An information processing method executed by an information processing apparatus, comprising:
- acquiring a first captured image obtained by first image capturing with a first shutter speed in an image sensor and a first motion amount about an object in the first captured image;
- setting a second shutter speed;
- estimating a second motion amount of an object in a second captured image which is obtained in a case where second image capturing is performed with the second shutter speed, based on the first motion amount, the first shutter speed, and the second shutter speed;
- determining a first shutter speed adjustment step size on the basis of a difference between the second motion amount and a first target motion amount that is lower than the second motion amount; and
- changing the second shutter speed for the second image capturing at a normal adjustment step size or at the first shutter speed adjustment step size in response to an operation member being operated.

13. A non-transitory computer-readable storage medium which stores a program for causing a computer to execute an information processing method comprising:
- acquiring a first captured image obtained by first image capturing with a first shutter speed in an image sensor and a first motion amount about an object in the first captured image;
- setting a second shutter speed;
- estimating a second motion amount of an object in a second captured image which is obtained in a case where second image capturing is performed with the second shutter speed, based on the first motion amount, the first shutter speed, and the second shutter speed;
- determining a first shutter speed adjustment step size on the basis of a difference between the second motion amount and a first target motion amount that is lower than the second motion amount; and
- changing the second shutter speed for the second image capturing at a normal adjustment step size or at the first shutter speed adjustment step size in response to an operation member being operated.

* * * * *